United States Patent
Garthwaite

(10) Patent No.: US 7,069,281 B2
(45) Date of Patent: Jun. 27, 2006

(54) EFFICIENT COLLOCATION OF EVACUATED OBJECTS IN A COPYING GARBAGE COLLECTOR USING VARIABLY FILLED LOCAL ALLOCATION BUFFERS

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 505 days.

(21) Appl. No.: 10/372,890

(22) Filed: Feb. 24, 2003

(65) Prior Publication Data

US 2004/0167945 A1    Aug. 26, 2004

(51) Int. Cl.
   *G06F 17/30* (2006.01)
(52) U.S. Cl. .................. 707/206; 707/205; 711/173; 711/209
(58) Field of Classification Search ............ 707/1–10, 707/100–104.1, 200–206; 711/170–173, 711/200–209, 132, 135, 147, 160–162; 719/312–315, 719/214, 1
See application file for complete search history.

(56) References Cited

U.S. PATENT DOCUMENTS

| | | |
|---|---|---|
| 4,724,521 A | 2/1988 | Carron et al. |
| 4,797,810 A | 1/1989 | McEntee et al. |
| 4,912,629 A | 3/1990 | Shuler, Jr. |
| 4,989,134 A | 1/1991 | Shaw |
| 5,088,036 A | 2/1992 | Ellis et al. |
| 5,333,318 A | 7/1994 | Wolf |
| 5,392,432 A | 2/1995 | Engelstad et al. |
| 5,485,613 A | 1/1996 | Engelstad et al. |
| 5,560,003 A | 9/1996 | Nilson et al. |
| 5,687,370 A | 11/1997 | Garst et al. |
| 5,801,943 A | 9/1998 | Nasburg |
| 5,845,276 A | 12/1998 | Emerson et al. |

(Continued)

FOREIGN PATENT DOCUMENTS

WO    WO 01/88713 A2 * 11/2001

OTHER PUBLICATIONS

Harris, Timothy L., Dynamic adaptive pre-tenuring, Oct. 2000, ACM SIGPLAN, 1-10.*

(Continued)

*Primary Examiner*—Shahid Alam
*Assistant Examiner*—Jean Bolte Fleurantin
(74) *Attorney, Agent, or Firm*—Kudirka & Jobse, LLP

(57) ABSTRACT

A copying garbage collector evacuates to a to space the objects in a from space that are referred to by references, including references in previously evacuated objects, that are located outside the from space. It divides the to space into local-allocation buffers ("LABs"), and it adopts one of these as a destination LAB, i.e., as the LAB into which it places the objects that it evacuates. When a destination LAB becomes full, the thread adopts a new LAB as its destination LAB. When a destination LAB's contents fill it to some predetermined fill threshold, that destination LAB becomes the source LAB, i.e., the LAB that the collector scans for references to the collection-set objects. If a previous source LAB's contents has not yet been completely scanned when the collector thus adopts a new source LAB, the previous source LAB is placed on a LAB stack. When no more references to unevacuated collection-set objects remain in its current source LAB, the collector then pops a LAB from its LAB stack on a last-in, first-out basis and adopts that LAB as the source LAB.

42 Claims, 33 Drawing Sheets

U.S. PATENT DOCUMENTS

| | | | |
|---|---|---|---|
| 5,845,298 | A | 12/1998 | O'Connor et al. |
| 5,857,210 | A | 1/1999 | Tremblay et al. |
| 5,873,104 | A | 2/1999 | Tremblay et al. |
| 5,873,105 | A | 2/1999 | Tremblay et al. |
| 5,900,001 | A | 5/1999 | Wolczko et al. |
| 5,903,900 | A | 5/1999 | Knippel et al. |
| 5,930,807 | A | 7/1999 | Ebrahim et al. |
| 5,953,736 | A | 9/1999 | O'Connor et al. |
| 5,960,087 | A | 9/1999 | Tribble et al. |
| 5,999,974 | A | 12/1999 | Ratcliff et al. |
| 6,021,415 | A | 2/2000 | Cannon et al. |
| 6,047,125 | A | 4/2000 | Agesen et al. |
| 6,049,390 | A | 4/2000 | Notredame et al. |
| 6,049,810 | A | 4/2000 | Schwartz et al. |
| 6,065,020 | A | 5/2000 | Dussud |
| 6,098,089 | A | 8/2000 | O'Connor et al. |
| 6,148,309 | A | 11/2000 | Azagury et al. |
| 6,148,310 | A | 11/2000 | Azagury et al. |
| 6,173,294 | B1 | 1/2001 | Azagury et al. |
| 6,185,581 | B1* | 2/2001 | Garthwaite ................. 707/206 |
| 6,226,653 | B1 | 5/2001 | Alpern et al. |
| 6,243,720 | B1 | 6/2001 | Munter et al. |
| 6,260,120 | B1 | 7/2001 | Blumenau et al. |
| 6,289,358 | B1 | 9/2001 | Mattis et al. |
| 6,308,185 | B1 | 10/2001 | Grarup et al. |
| 6,314,436 | B1 | 11/2001 | Houldsworth |
| 6,321,240 | B1 | 11/2001 | Chilimbi et al. |
| 6,353,838 | B1 | 3/2002 | Sauntry et al. |
| 6,381,738 | B1 | 4/2002 | Choi et al. |
| 6,393,439 | B1 | 5/2002 | Houldsworth et al. |
| 6,415,302 | B1* | 7/2002 | Garthwaite et al. ......... 707/206 |
| 6,424,977 | B1* | 7/2002 | Garthwaite ................. 707/206 |
| 6,434,576 | B1* | 8/2002 | Garthwaite ................. 707/206 |
| 6,434,577 | B1* | 8/2002 | Garthwaite ................. 707/206 |
| 6,442,661 | B1 | 8/2002 | Dreszer |
| 6,449,626 | B1* | 9/2002 | Garthwaite et al. ......... 707/206 |
| 6,496,871 | B1 | 12/2002 | Koyama et al. |
| 6,529,919 | B1* | 3/2003 | Agesen et al. .............. 707/206 |
| 6,567,905 | B1 | 5/2003 | Otis |
| 6,640,278 | B1 | 10/2003 | Nolan et al. |
| 6,757,890 | B1 | 6/2004 | Wallman |
| 6,769,004 | B1 | 7/2004 | Barrett |
| 6,799,191 | B1* | 9/2004 | Agesen et al. .............. 707/206 |
| 6,820,101 | B1 | 11/2004 | Wallman |
| 6,826,583 | B1 | 11/2004 | Flood et al. |
| 6,868,488 | B1* | 3/2005 | Garthwaite ................. 711/173 |
| 6,892,212 | B1 | 5/2005 | Shuf et al. |
| 6,928,450 | B1 | 8/2005 | Mogi et al. |
| 6,931,423 | B1 | 8/2005 | Sexton et al. |
| 6,996,590 | B1* | 2/2006 | Borman et al. ............. 707/206 |
| 2002/0032719 | A1 | 3/2002 | Thomas et al. |
| 2002/0095453 | A1 | 7/2002 | Steensgaard |
| 2002/0133533 | A1 | 9/2002 | Czajkowski et al. |
| 2002/0138506 | A1 | 9/2002 | Shuf et al. |
| 2003/0088658 | A1 | 5/2003 | Davies et al. |
| 2003/0200392 | A1 | 10/2003 | Wright et al. |
| 2003/0217027 | A1 | 11/2003 | Farber et al. |
| 2004/0010586 | A1 | 1/2004 | Burton et al. |
| 2004/0039759 | A1 | 2/2004 | Detlefs et al. |
| 2004/0215914 | A1 | 10/2004 | Dussud |

OTHER PUBLICATIONS

Jones and Lins, "Garbage Collection: Algorithms for Automatic Dynamic Memory Management," 1996, pp. 165-179, Wiley, New York.

Paul Wilson, "Uniprocessor Garbage Collection Techniques," Technical Report, University of Texas, 1994.

Hudson and Moss, "Incremental Collection of Mature Objects," Proceedings of International Workshop on Memory Management, 1992, Springer-Verlag.

Grarup and Seligmann, "Incremental Mature Garbage Collection," M.Sc. Thesis, Aarhus University, Computer Science Department, Aug. 1993, http://www.daimi.au.dk/~jacobse/Papers/.

Seligmann and Grarup, "Incremental Mature Garbage Collection Using the Train Algorithm," Proceedings of ECOOP '95, Ninth European Confernce on Object-Oriented Programming, 1995, http://www.daimi.au.dk/~jacobse/Papers/.

Clark and Mason, "Compacting Garbage Collection can be Fast and Simple," Software-Practice and Experience, Feb. 1996, pp. 177-194, vol. 26, No. 2.

Henry G. Baker, Jr., "LIst Processing in Real Time on a Serial Computer," Communications of the ACM, vol. 21, No. 4, Apr. 1978, pp. 280-294.

Appel, Ellis, and Li, "Real-timeConcurrent Collection on Stock Multiprocessors," Digital Equipment Corporation, Systems Research Center, Feb. 14, 1988.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 256-262, Aug. 1984. Austin, Texas.

Herlihy and Moss, "Lock-Free Garbage Collection for Multiprocessors," ACM SPAA, 1991, pp. 229-235.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective 'Static Graph' Reorganization to Improve Locality in Garbage-Collected Systems," Proceedings of the ACM SIGPLAN Conference on Programming Language Design and Implementation, Jun. 1991, pp. 177-191, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement," International Symposium on Memory Management, Oct. 1998.

Lieberman and Hewitt, "A Real-Time Garbage Collector Based on the Lifetime of Objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19 No. 5.

Andrew W. Appel, "Simple Generational Garbage Collection and Fast Allocation," Software-Practice and Experience, 1989, pp. 171-183, vol. 19, No. 2.

Hudson and Diwan, "Adaptive Garbage Collection for Modula-3 and Smalltalk," in OOPSLA/ECOOP workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented Systems, Oct. 1993, pp. 1-8, Edited by Moss, Wilson, and Zorn.

Hosking and Moss, "Protection traps and alternatives for memory management of an object-oriented language," ACM Proceedings of the Fourteenth ACM Symposium on Operating Systems Prinicples, Dec. 1993, pp. 106-119, vol. 27, No. 5.

Hosking, Moss, and Stefanovic, "A Comparative Performance Evaluation of Write Barrier Implementations," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988.

Arora, Blumfoe, and Plaxton, "Thread Scheduling for Multiprogrammed Multiprocessors," Proceedings of the Tenth Annual ACM Symposium on Parallel Algorithms and Architecture, JUn. 1998.

Douglas W. Clark, "An Efficient List-Moving Algorithm Using Constant Workspace," Communications of the ACM, Jun. 1976, pp. 352-354, vol. 19, No. 6.

C. J. Cheney, "A Nonrecursive List Compacting Algorithm," Communications of the ACM, Nov. 1970, pp. 677-678, vol. 13, No. 11.

Goldstein, Schauser, and Culler, "Lazy Threads: Implementing a Fast Parallel Cell," Journal of Parallel and Distributed Computing, Aug. 1998, pp. 5-20, vol. 37, No. 1.

James Stamos, "A Large Object-Oriented Virtual Memory: Grouping Strategies, Measurements, and Performance", XEROX PARC memo SCG-82-2, May 1982.

U.S. Appl. No. 10/287,851, filed Nov. 5, 2002, Garthwaite, et al.

Appleby, Karen, Garbage Collection for Prolog Based on WAM, vol. 31, Issue 6, Communication of the ACM, Jun. 1, 1996, 719-741.

Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley "In of Out? Putting Write Barriers in Their Place", Jun. 20, 2002, Berlin.

Flood, et al., "Parallel Garbage Collection for Shared Memory Multiprocessors", USENIX JVM Conference, Apr. 2001.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Holzle, Urs, "A Fast Write Barrier for Generational Garbage Collectors", Workshop on Garbage Collection in Object Oriented Systems, Oct. 1993.

Hudson, et al., "A Language—Independent Garbage Collector Toolkit", Coins Technical Report, Sep. 1991.

Hudson, et al., "Training Distributed Garbage: The DMOS Collector", University of St. Andrews Tech Report, 1997, 1-26.

Hudson, et al., "Garbage Collecting the World: One Car at a Time" ACM SIGPLAN Notices 32, 1997, 162-175.

Hudson, et al., "Sapphire: Copying GC Without Stopping the World", Practice and Experience Special Issue, Date Unknown, JAVA/Grande/Iscope.

Liskov, et al., "Partitioned Garbage Collection of a Large Stable Heap", Proceedings of IWOOOS, 1996, 117-121.

Moss, et al., "A Complete and Coarse-Grained Incremental Garbage Collection for Persisten Object Stores", Proceedings 7th Int'l Workshop on Persisten Object System, 1996, 1-13, Cape May, NJ.

Munro, et al., "Incremental Garbage Collection of a Persistent Object Store using PMOS", 3rd Int'l Workshop on Persistence and Java, 1998, 78-91, Tiburon, California.

Nettles, Scott, "Real-Time Replication Garbage Collection", Avionics Lab, Wright Research and Developmental Center, 1993, PDDI.

Padopoulos, "Hood: A User-Level Thread Library for Multiprogramming Multiprocessors, Thesis: The Uni. of TX", University of Texas, Aug. 1998, 1-71, Austin.

Roy, et al., "Garbage Collection in Object-Oriented Databases Ising Transactional Cyclic Reference Counting", VLDB Journal—The International Journal on Very Large Da Bases, vol. 7, Issue 3, 1998, 179-193.

Shuf, et al., "Exploiting Profilic Types for Memory Management and Optimizations. ACM ISBN Sep. 2, 2001", POPL, Jan. 2002, Portland.

Ungar, et al., "Tenuring Policies for Generation-Based Storage Reclamation", ACM SIGPLAN Notices, 1988, 23(11)1-17.

Venners, "Garbage Collection, Inside the JAVA 2 Virtual Machine; Chapter 9", www.artima.com, Date Unknown, parts 1-18.

Wilson, "Uniprocessor Garbage Collection Techniques", Proceedings of Int'l Workshop on Memory Management, 1992, V. 637.

Withington, P.T., "How Real is the "Real Time" GC?", Symbolics, Inc., Oct. 6, 1991, Burlington, MA.

Zee, et al., "Write Barrier Removal by Static Analysis", OOPSLA '02, Nov. 2002.

Zorn, "Segregating Heap Objects by Reference Behavior and Lifetime", In 8th Int'l Conferenceon Architectural Support for Programming Languages and Operating Systems, Oct. 1998, 12-32, San Jose, CA.

Zorn, Benjamin, "Barrier Methods for Garbage Collection", Dept. of Computer Science, Uni. of Colorado, Nov. 1990, 1-37, Boulder.

Azagury, et al., "Combining Card Marking With Remembered Sets: How to Save Scanning Time", ACM SIGPLAN Notices, Oct. 1998, V. 34(3), ACM Press, Vancouver, Canada.

Cheng, et al., "Generational Stack Collection and Profile-Driven Pretenuring", SIGPLAN'98 Conference on Programming Languages Design and Implementation, Jun. 1998, 162-173, ACM Press, Montreal, Canada.

Lam, et al., "Object Type Directed Garbage Collection to Improve Locality", Proceedings of the International Workshop on Memory Management, Sep. 1992, 404-425, St. Malo, France.

Pirinen, Pekka, "Barrier Techniques for Incremental Tracing", Harlequin Limited, Date Unknown, 20-25, Cambridge, Great Britain.

Wilson, et al., "Effective Static-Graph Reorganization to Improve Locality in Garbage Collected Systems", Proceedings of the ACM SIGPLAN Conference on Programming Language Design and Implementation, Jun. 1991, Canada.

* cited by examiner

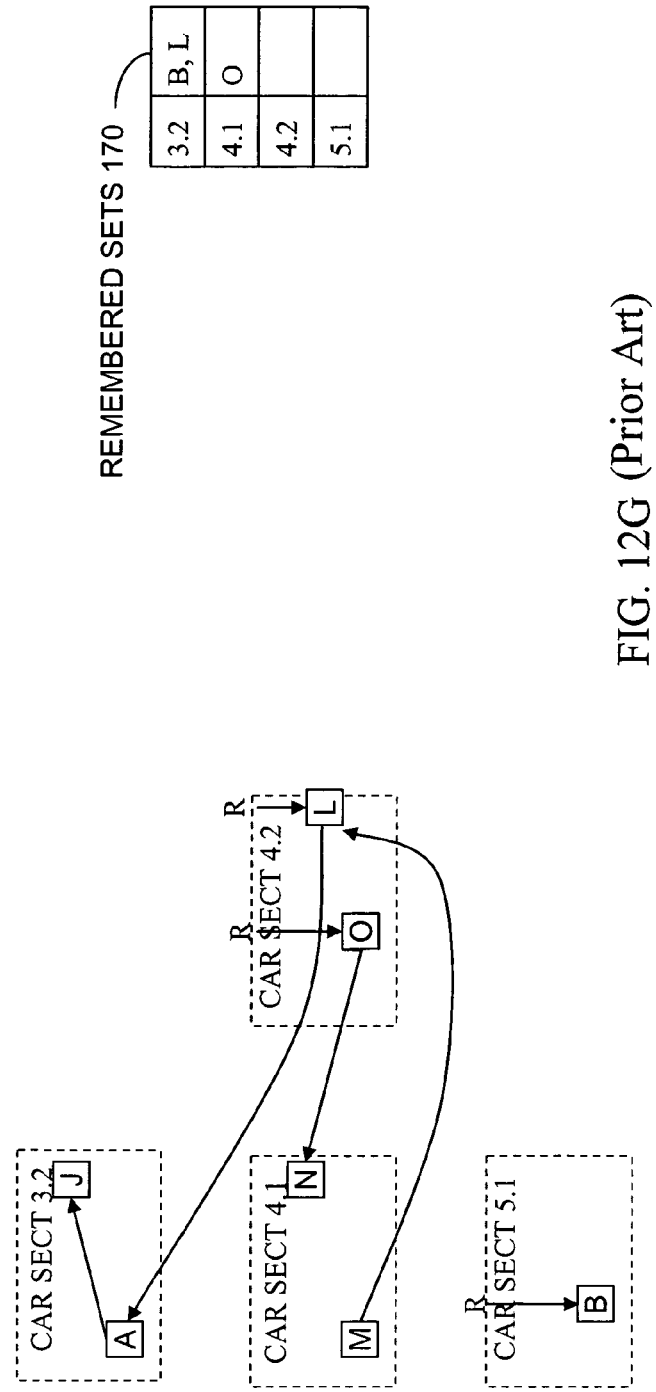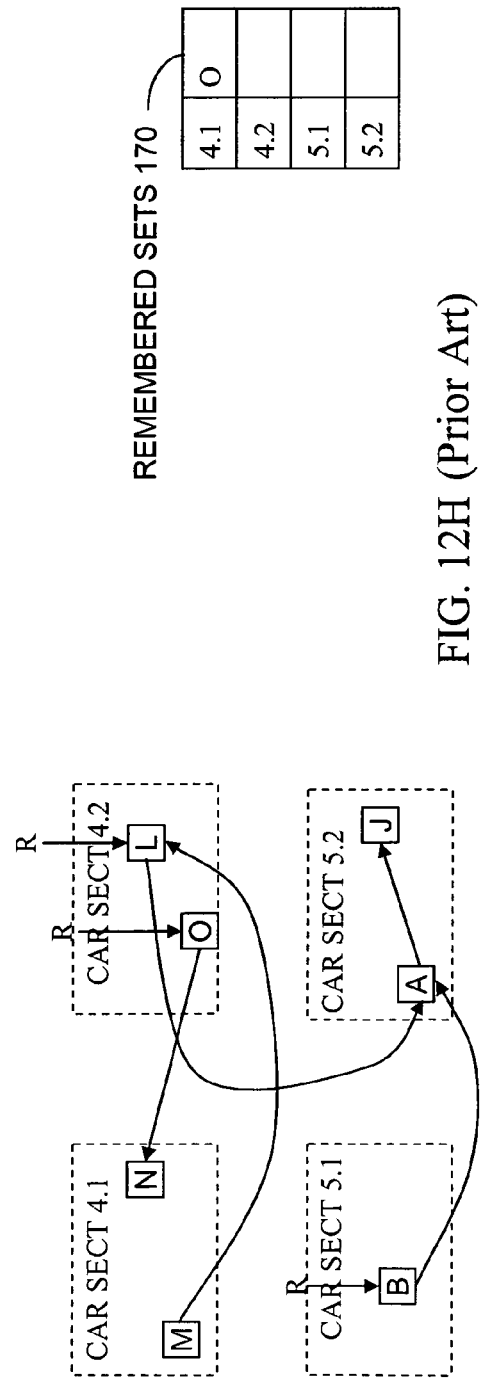
FIG. 12G (Prior Art)
FIG. 12H (Prior Art)

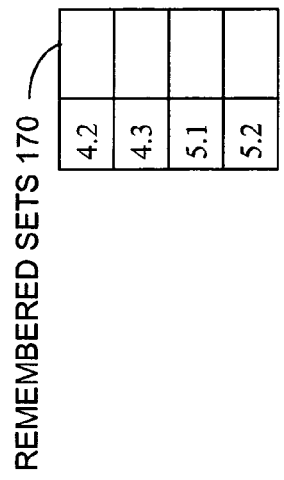
FIG. 12I (Prior Art)
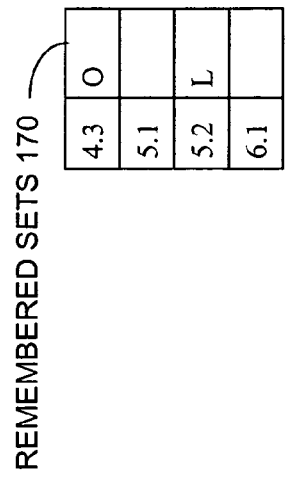
FIG. 12J (Prior Art)
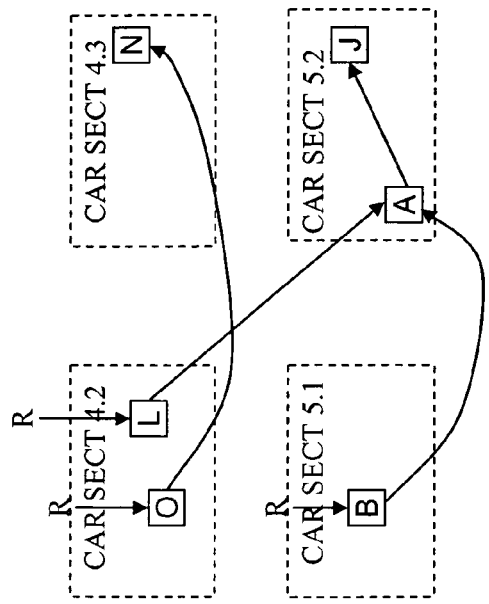
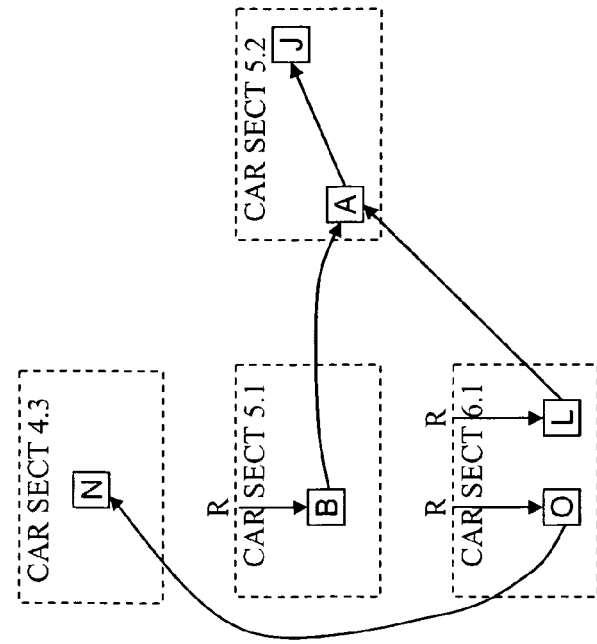

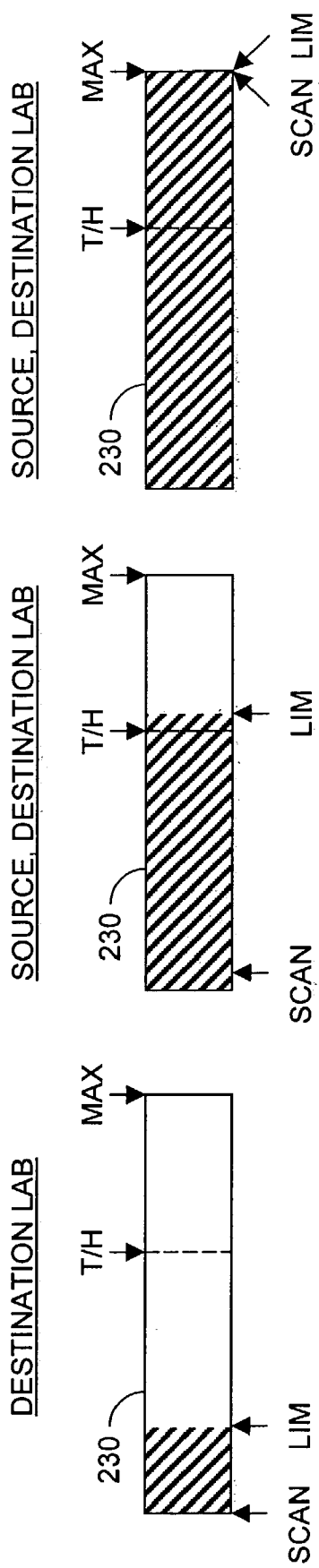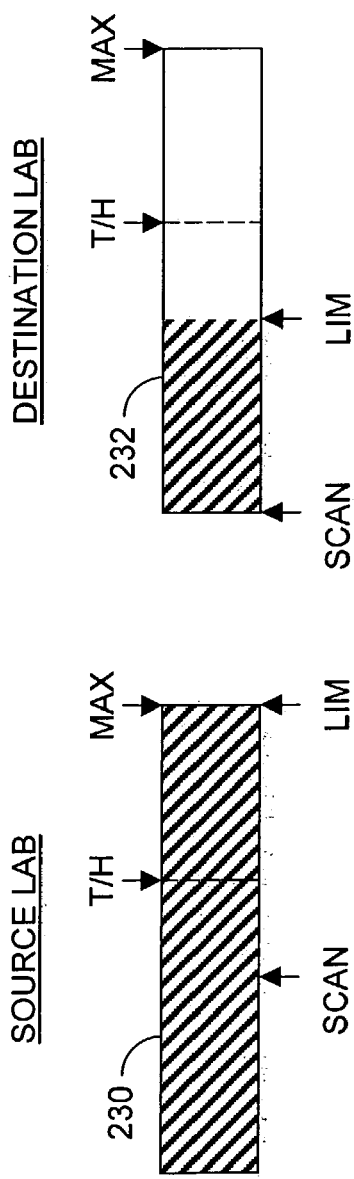
FIG. 17
FIG. 18
FIG. 19
FIG. 20

EFFICIENT COLLOCATION OF EVACUATED OBJECTS IN A COPYING GARBAGE COLLECTOR USING VARIABLY FILLED LOCAL ALLOCATION BUFFERS

CROSS-REFERENCE TO RELATED APPLICATION

This application is related to U.S. patent application Ser. No. 10/373,147 of Alexander T. Garthwaite for a Space-Efficient, Depth-First Parallel Copying Collection Technique Making Use of Work-Stealing on the Same Structures That Maintain the Stack of Items to Be Scanned, which was filed on the same date as the instant application.

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example.

Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17. Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed. Now, some of the functionality that source-language constructs specify can be quite complicated, requiring many machine-language instructions for their implementation.

One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modern systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity. Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process.

And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

To limit the resultant pause times, a cycle may be divided up among a plurality of collector intervals. If so, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations" although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as having possibly been modified since that interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection interval to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection interval. To illustrate how such updating and other collection operations may be carried out, FIG. 8 depicts an operational sequence in a system of the typical type mentioned above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object.

The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates.

And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate. If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as the illustrated cycles do, without the mutator's making any reference changes and without any addition of further objects. But reflection reveals that the general approach just described still applies when such mutations occur.

The train algorithm is but one, incremental example of a copying-type garbage collector. In general, a copying-type collector reclaims a "from" space—e.g., the collection set in the above example—after evacuating from it those objects that have been identified as potentially reachable. The design of a copying collector presents the question of what order to employ in evacuating such objects. In the example given above, a so-called depth-first order was chosen for the sake of explanation. In a depth-first order, all of the "descendants" of an evacuated object are evacuated before any non-descendant objects are. An object is a descendant of a given object if it is referred to by a reference that is located in the given object or in one of the given object's descendants. A depth-first order is contrasted with a breadth-first order, in which objects are evacuated in the order in which references to them occur. In a strictly breadth-first order, for instance, all of the objects that references identified by a remembered set refer to are evacuated first, and the remaining reachable objects are evacuated in the order in which references to them occur in the space that the already-evacuated objects occupy.

An advantage of the depth-first type of evacuation is that it tends to afford the mutator more locality of reference. If an object is located near to objects referred to by its member references, the objects to which it refers are more likely to be loaded into memory or cache together with it, so fewer cache misses and page faults are likely to occur.

While depth-first evacuation does tend in some ways to benefit the mutator, it detracts from it in others ways. For example, it can increase the pause times that collectors impose because of the cost of keeping track of tasks that have been identified but need to be postponed; a breadth-first order does not suffer this overhead.

Because of these countervailing considerations, workers in the field have tried to employ evacuation sequencing that is neither strictly depth-first nor strictly breadth-first. Instead, they have used sequences that employ features of both so as to partake of both approaches' advantages while reducing their drawbacks.

One approach is described by David A. Moon, "Garbage Collection in a Large LISP system," *Conference Record of the* 1984 *ACM Symposium on LISP and Functional Programming*, Austin, Tex., ACM Press, August 1984. In the approach described there, the to space is divided into an ordered sequence of pages. Objects from the from space are placed into to-space pages in accordance with those pages' physical order, so the to space typically consists of an initial number of completely filled pages, a terminal number of completely empty pages, and possibly a partially filled page between them. This partially filled page is scanned in physical order for references into the from space, and a local-scan pointer is maintained to indicate where in that partially filled page the collector should continue scanning. If the resultant evacuation ends up filling that (previously) partial page, scanning for references on that page temporarily ends, typically leaving unscanned references, there, and scanning for references to objects that will be evacuated to the next, empty from-space page starts in the first page that has not been completely scanned. As soon as the collector thereby evacuates an object to that next page, it treats that object as a "seed": that page, which is now partially filled, becomes the reference source. If the collector ends up having scanned all of the partially filled page's references without filling that page, then the collector again looks for further references in the first page that has not been completely scanned.

One problem with the Moon approach is that it duplicates some scanning; in the worst case, all objects are scanned twice. To eliminate that duplication, a different approach is proposed in Wilson et al., "Effective 'Static-Graph' Reorganization to Improve Locality in Garbage-Collected Systems," *ACM SIGPLAN Notices,* 26(6): 177–191, 1991. In that approach, a major scan pointer points to the first page of to space that has not been completely scanned. A major free pointer points to the first free location in the first page in to space that has not been filled completely. Also, each page has its own local minor scan pointer.

If no pointer to an unevacuated from-space object remains in the page containing the location that Wilson et al.'s major free pointer identifies, scanning resumes at the first unscanned location—i.e., at the location pointed to by the minor scan pointer associated with the page identified by the major scan pointer—for references to from-space objects that have not yet been evacuated. If no unevacuated from-space object is thus found in that page, the major scan pointer is advanced page by page to the next page containing an unscanned reference. Once all pages have been scanned, the copying operation is over. If one is found, though, it is evacuated to the end of the to space's occupied portion, i.e., to the location identified by the major free pointer. Beginning at the position identified by the minor scan pointer for the page containing that location, the collector then scans that page's references in order and, in a breadth-first manner, evacuates the unevacuated from-space objects thereby found. That scanning and evacuation continue until the page is filled or all of its references have been scanned, which ever comes first. The collector then returns to the first unscanned location to scan for references to from-space objects.

The Moon and Wilson et al. approaches both achieve a significant degree of collocation without suffering the overhead that a strictly depth-first sequence's unbounded object stack would cause.

SUMMARY OF THE INVENTION

I have devised an approach that is similar to those of Moon and Wilson et al. but that tends to result in more-efficient collector performance. As Moon and Wilson et al. do, I divide the to space into segments. These are preferably virtual-address pages or other memory segments that the computer system in some sense treats as a unit. I have come to refer to these segments as local-allocation buffers ("LABs"). The collector (or thread thereof) designates one LAB at a time as its source LAB and one LAB at a time as its destination LAB. The source LAB contains the references that the collector scans to determine whether they refer to from-space objects, and the destination LAB—which is often the same as the source LAB—is the LAB into which from-space objects thus found are evacuated.

If the destination LAB becomes full, the collector adopts a new LAB as its destination LAB. As objects are placed into that LAB, the collector monitors it to determine whether it has yet been filled to a predetermined partial-fill level. When the destination LAB reaches that fill level, it becomes the source LAB, and, if the collector has not yet scanned all of the previous source LAB's references, it places that previous source LAB on a LAB stack that it uses to keep track of the LABs that need further processing. If, while the destination LAB is the source LAB, no references in it remain unscanned, the collector adopts as its new source LAB the last LAB that was placed on the LAB stack. In a multi-threaded embodiment, a thread that has run out of references to scan may "steal" a LAB from another thread's LAB stack for load-balancing purposes.

By not adopting the destination LAB as the source LAB until it has reached the partial fill level, the collector reduces cache-line thrashing yet can maintain nearly as much collocation in the resultant object placement as results from the single-object- "seed" approach of Moon and Wilson et al. Moreover, the resultant locality is enhanced by the fact that incompletely scanned LABs that have been placed on the LAB stack are adopted as source LABs in a last-in, first-out order. And, while the degree of locality depends on how judiciously the partial-fill level is chosen, that fill level can be adjusted adaptively in accordance factors such as the types of objects being evacuated and whether source LABs that were also destination LABs have tended to overflow.

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

FIG. 17 is a data-structure diagram that depicts an early stage in the process of filling a LAB;

FIG. 18 is a similar diagram depicting an intermediate stage;

FIG. 19 is a similar diagram depicting a situation in which the completions of a LAB's filling and its scanning coincide;

FIG. 20 is a data-structure diagram that illustrates one LAB's being filled with objects referred to by references in another LAB;

DETAILED DESCRIPTION OF AN ILLUSTRATIVE EMBODIMENT

Figure 1:
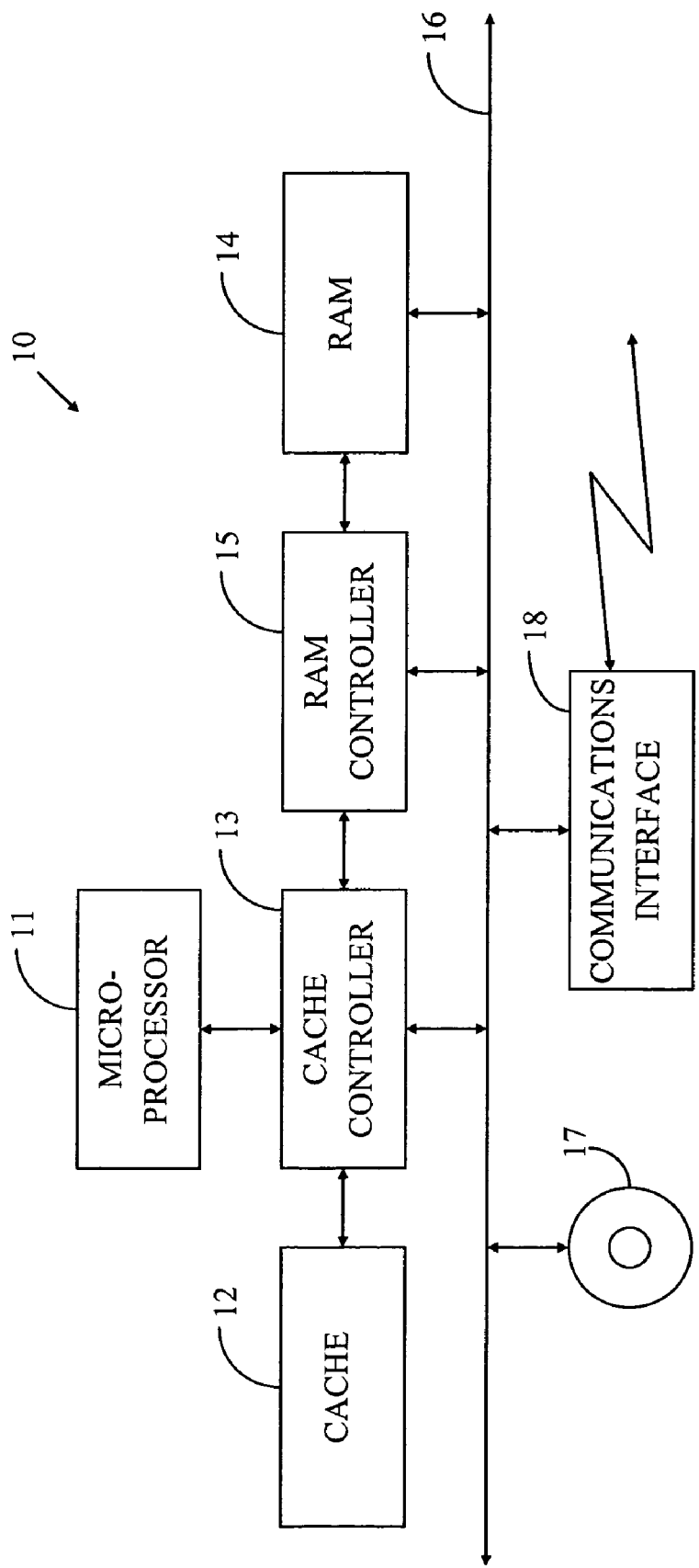
FIG. 1, discussed above, is a block diagram of a computer system in which the present invention's teachings can be practiced.
Figure 2:
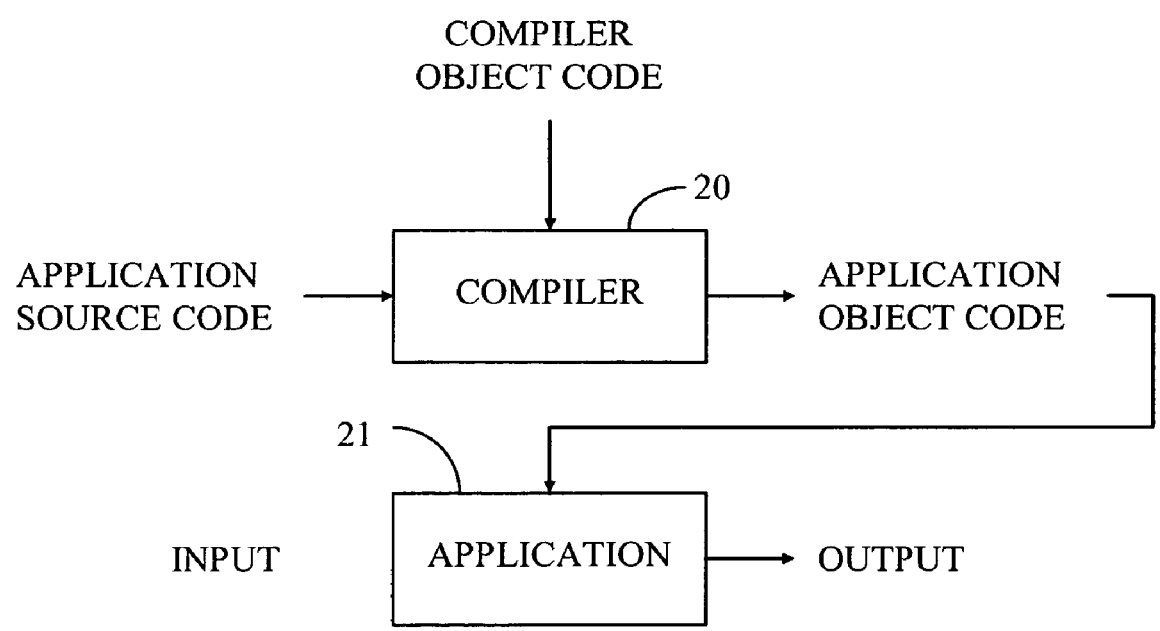
FIG. 2 is, discussed above, is a block diagram that illustrates a compiler's basic functions.
Figure 3:
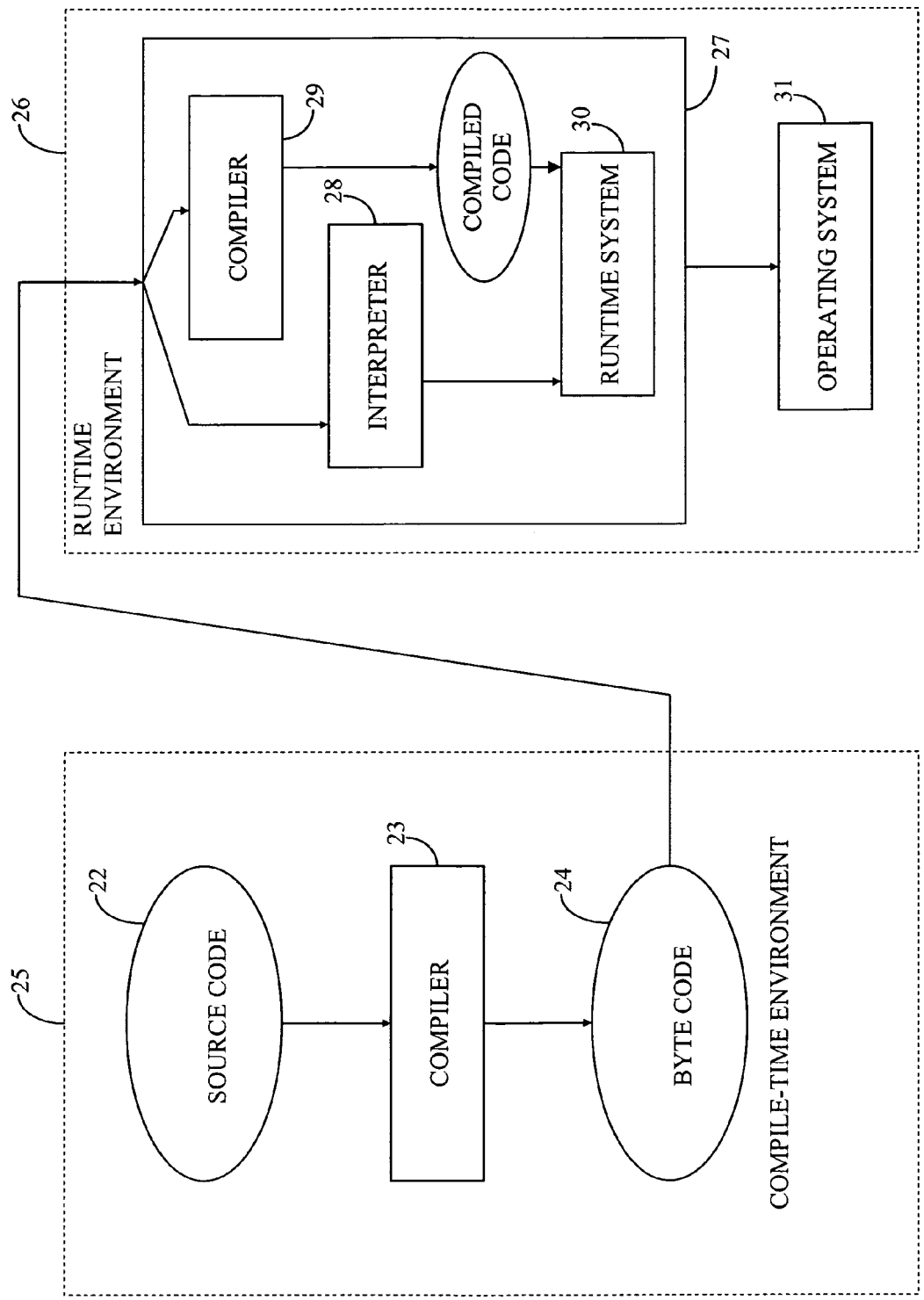
FIG. 3, discussed above, is a block diagram that illustrates a more-complicated compiler/interpreter organization.
Figure 4:
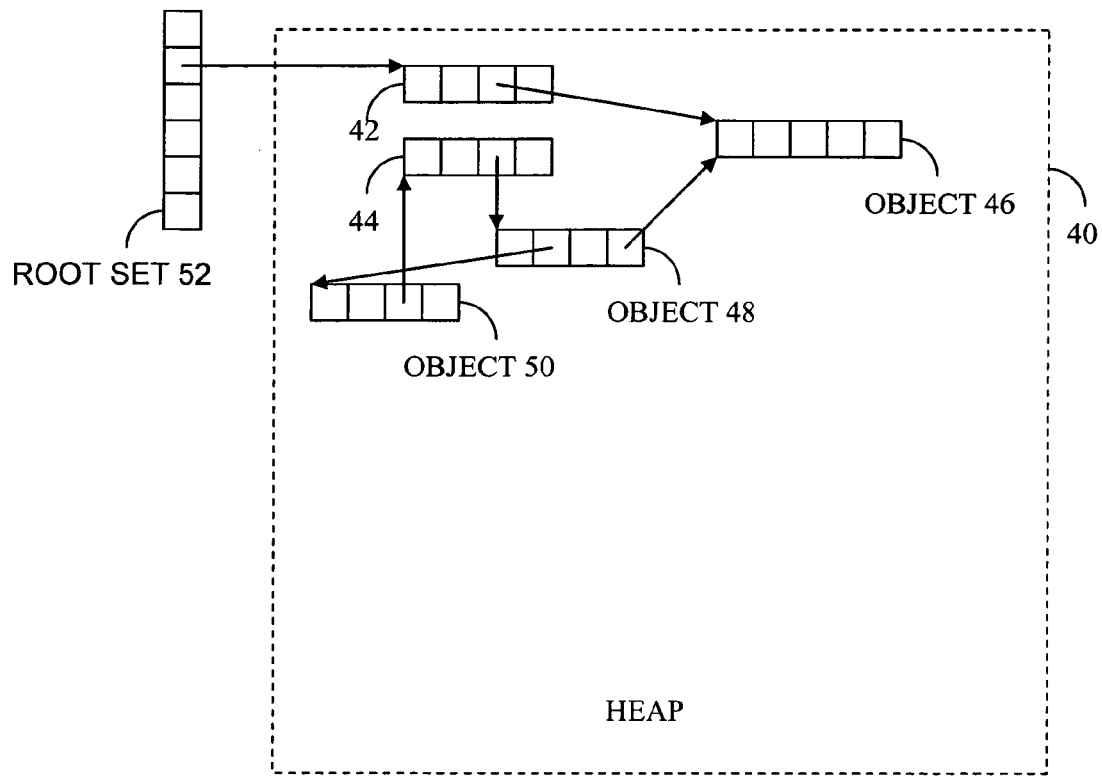
FIG. 4, discussed above, is a diagram that illustrates a basic garbage-collection mechanism.
Figure 5:
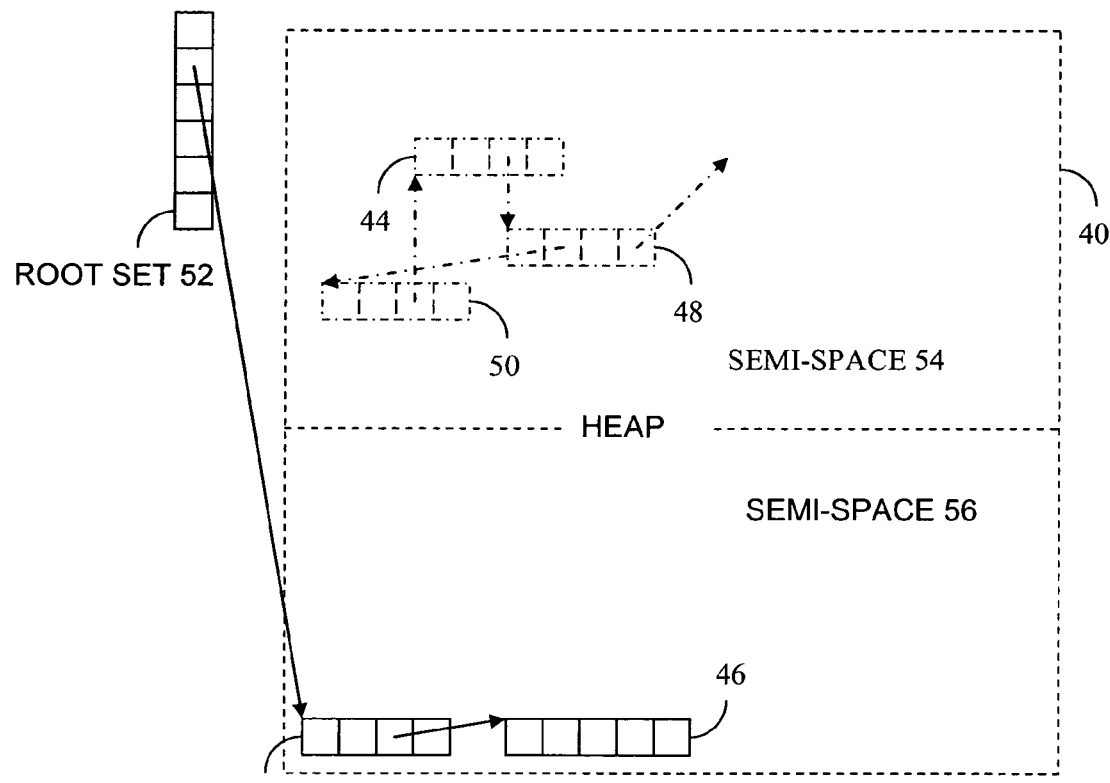
FIG. 5, discussed above, is a similar diagram illustrating that garbage-collection approach's relocation operation.
Figure 6:
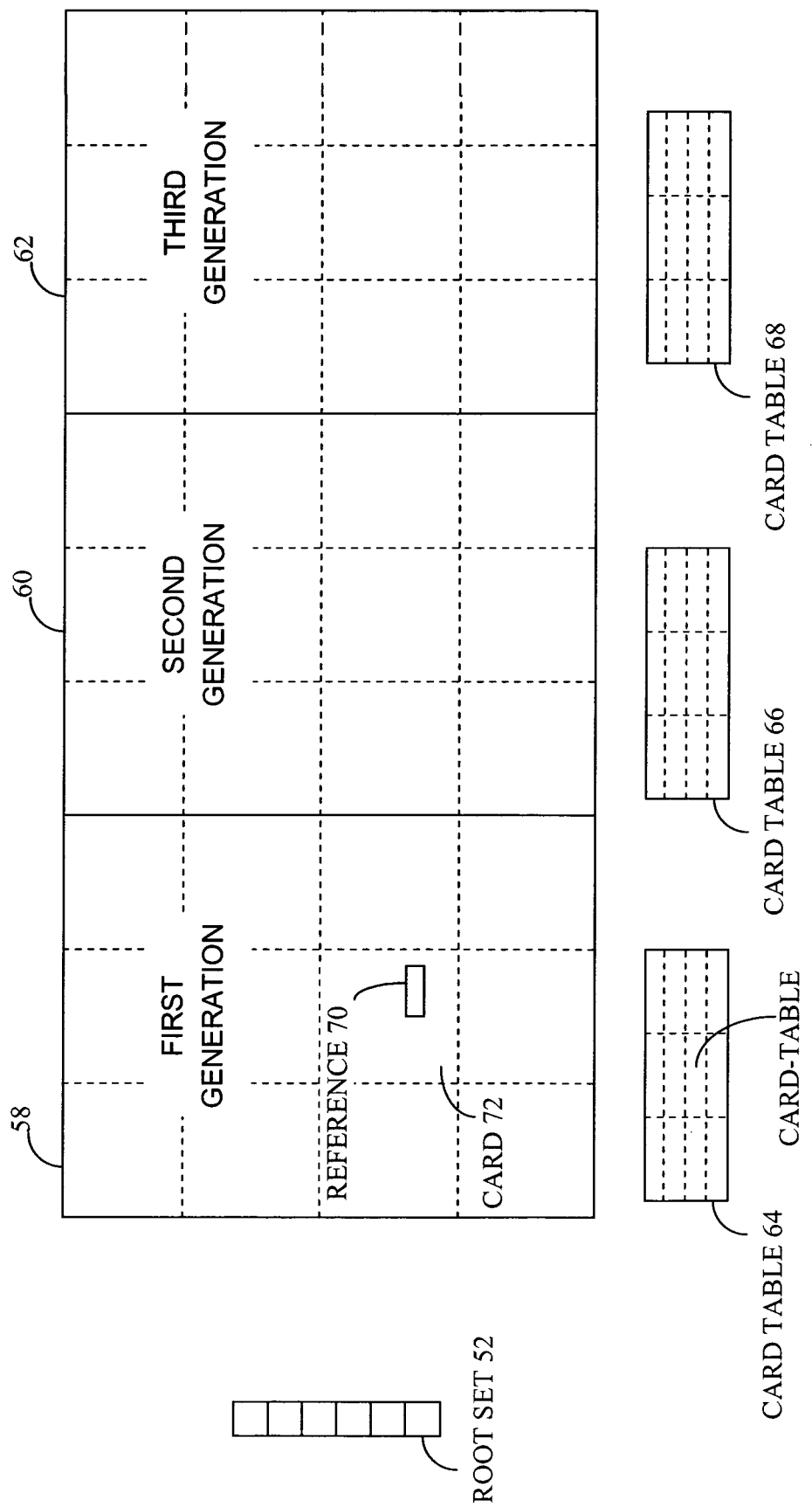
FIG. 6, discussed above, is a diagram that illustrates a garbage-collected heap's organization into generations.
Figure 7:
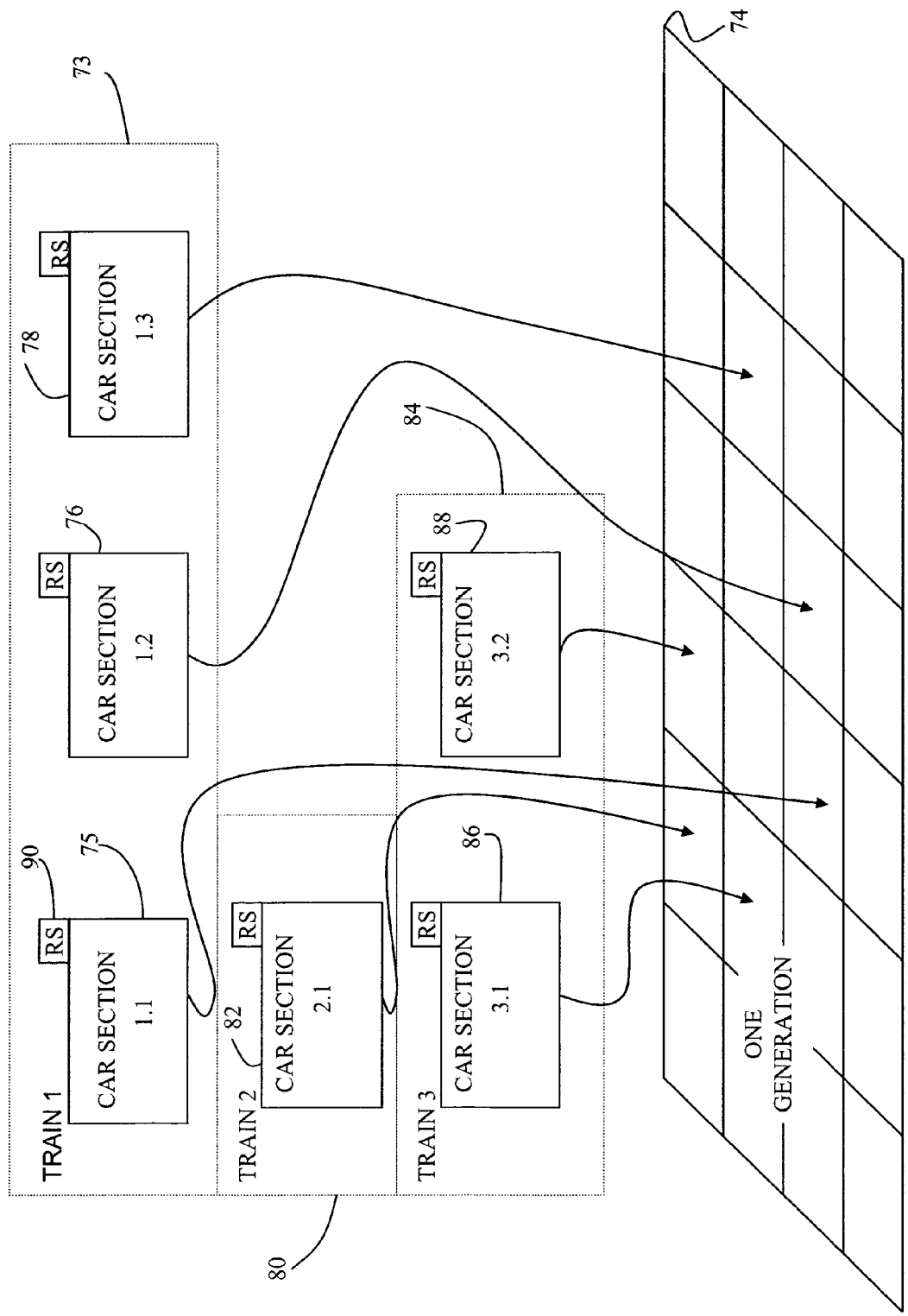
FIG. 7, discussed above, is a diagram that illustrates a generation organization employed for the train algorithm.
Figure 8A:
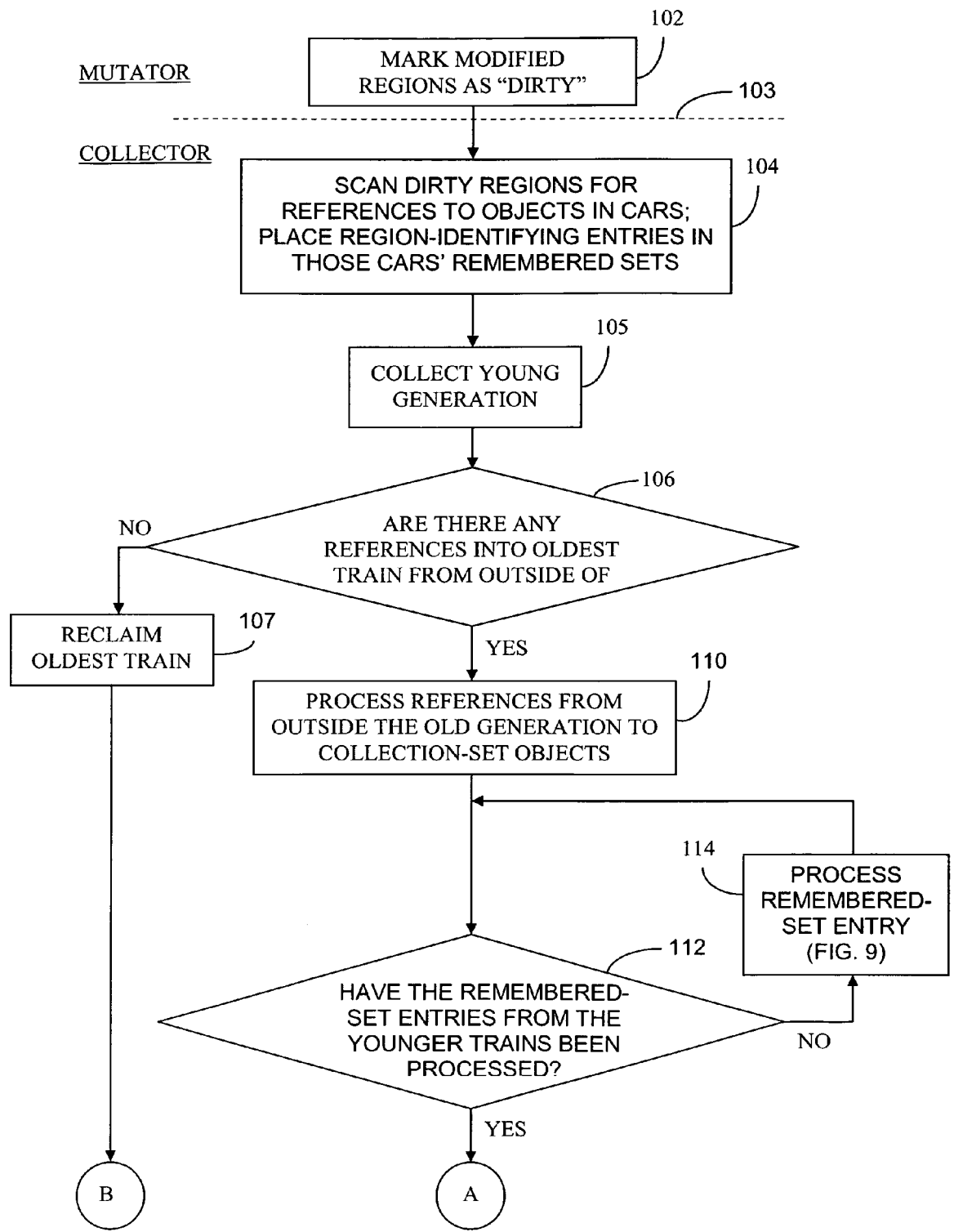
FIGS. 8A and 8B, discussed above, together constitute a flow chart that illustrates a garbage-collection interval that includes old-generation collection.
Figure 8B:
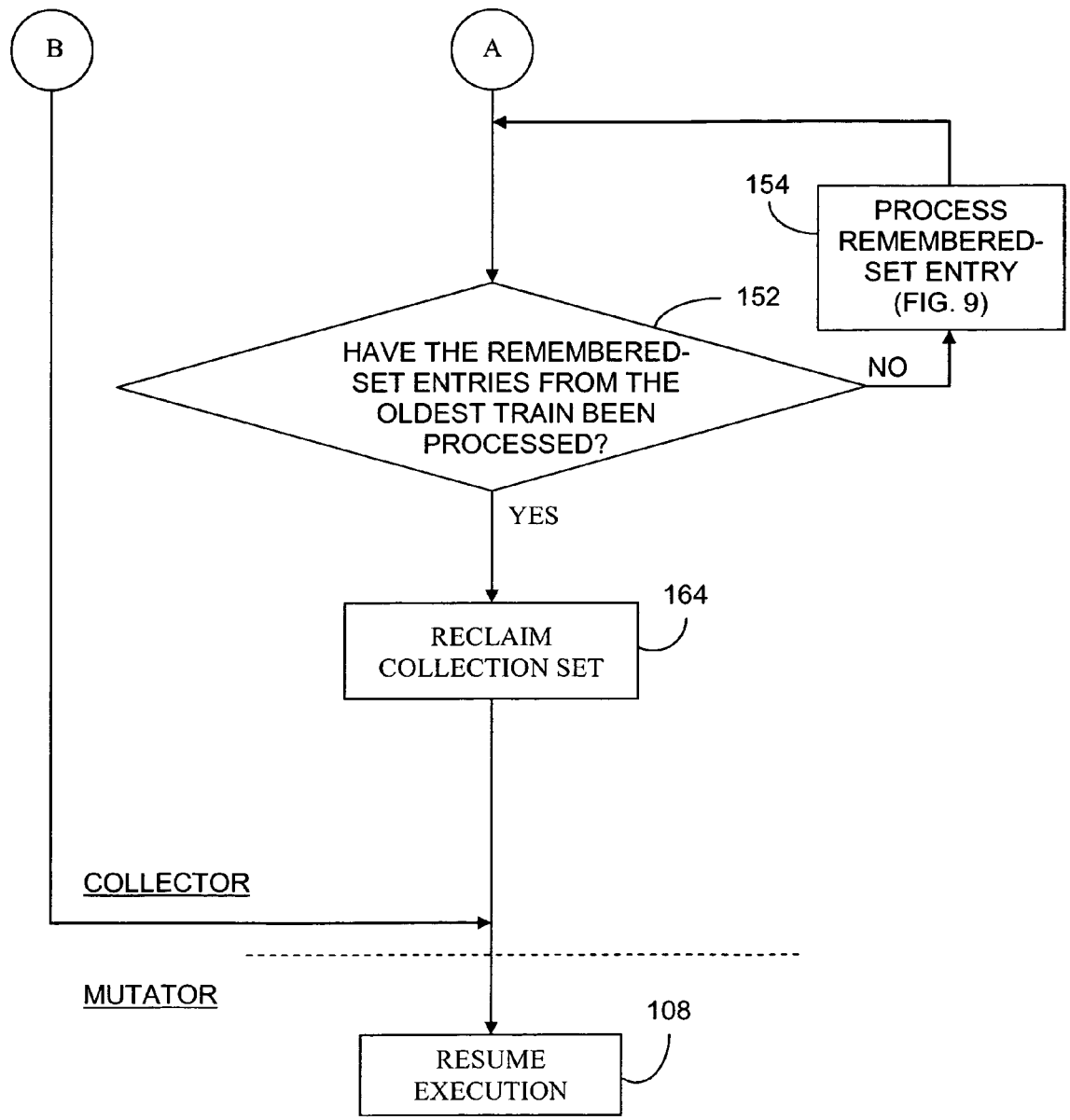
Figure 9:
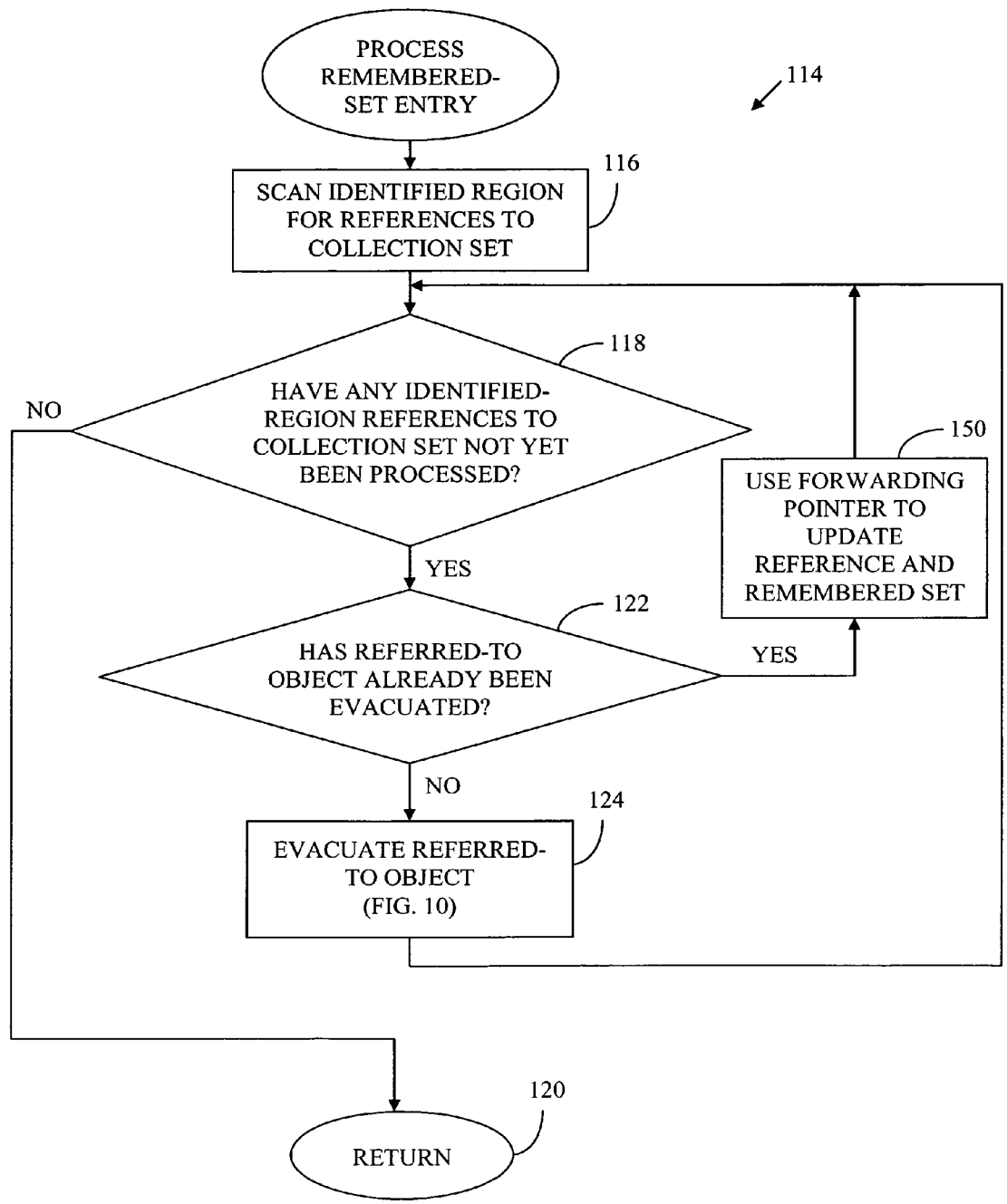
FIG. 9, discussed above, is a flow chart that illustrates in more detail the remembered-set processing included in FIG. 8A.
Figure 10:
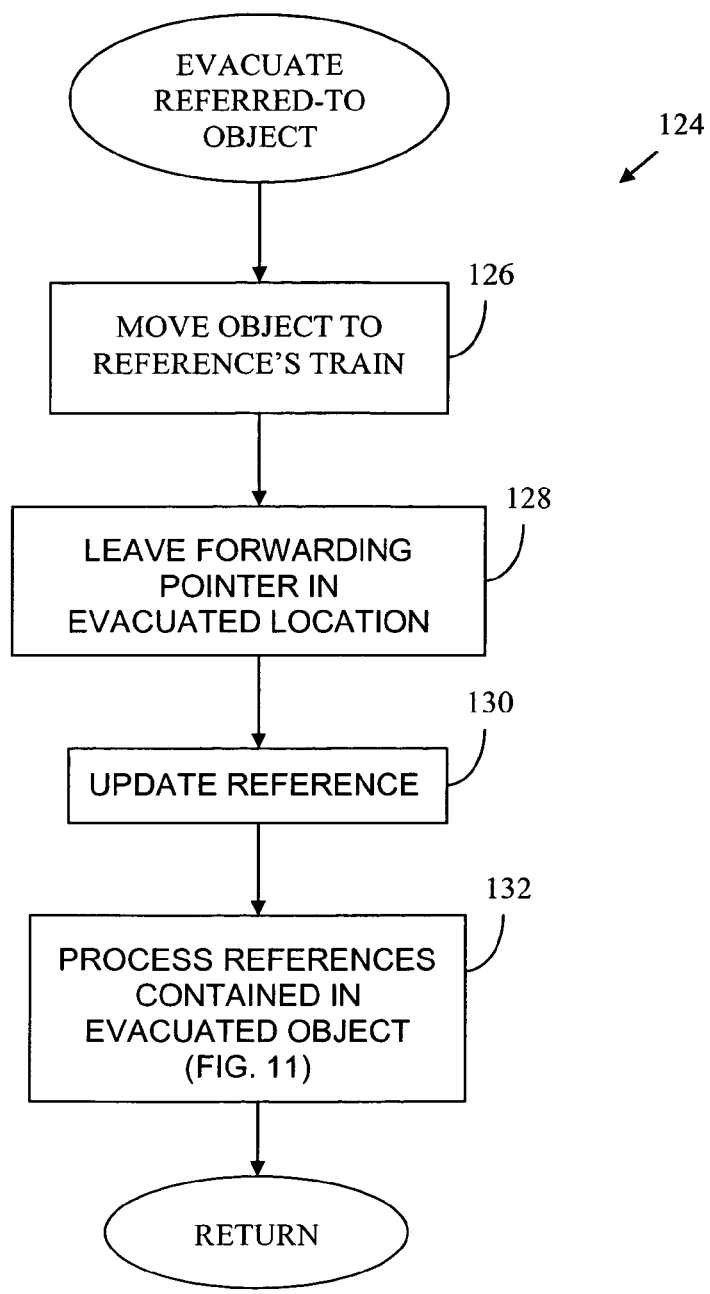
FIG. 10, discussed above, is a block diagram that illustrates in more detail the referred-to-object evacuation that FIG. 9 includes.
Figure 11A:
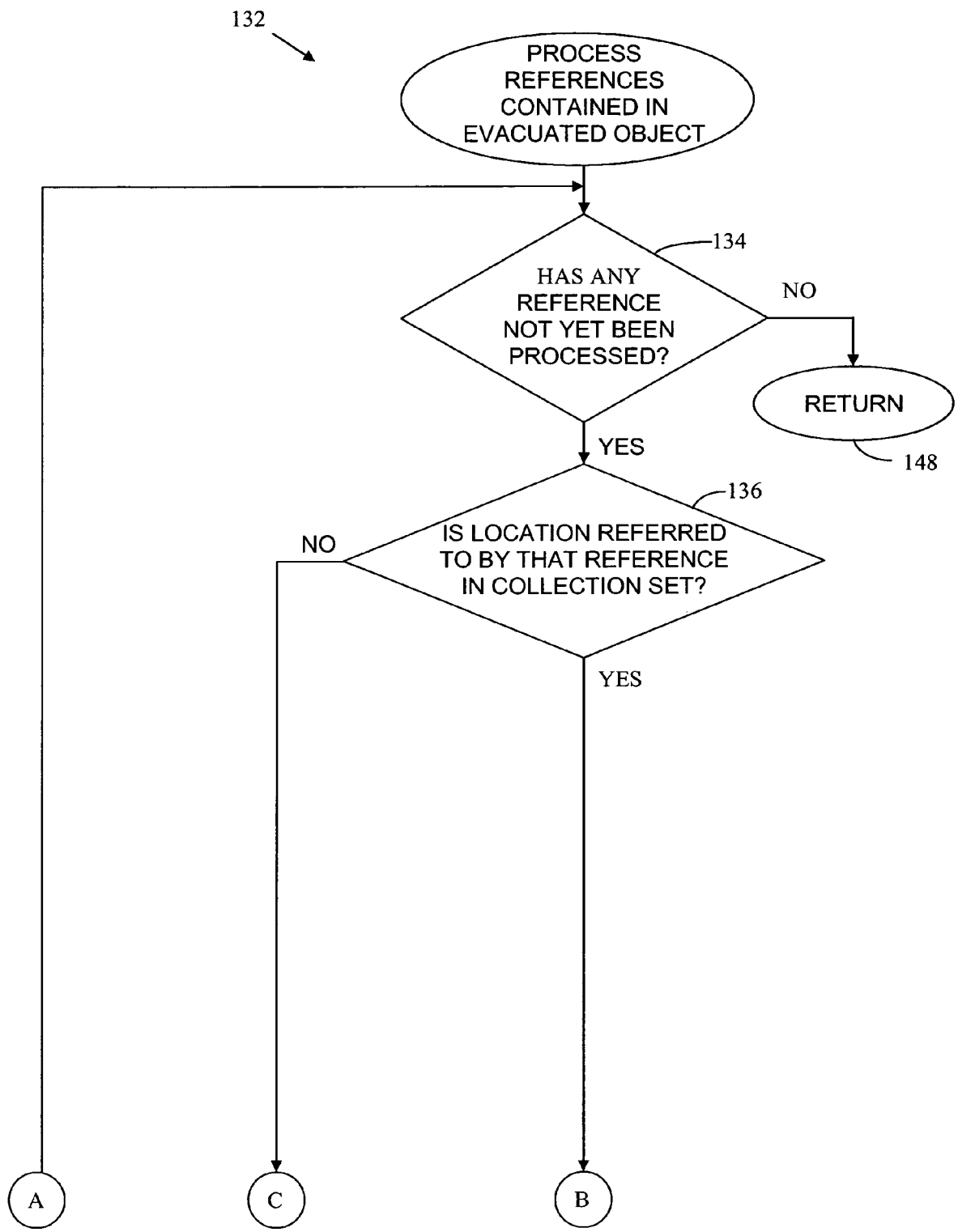
FIGS. 11A and 11B, discussed above, together form a flow chart that illustrates in more detail the FIG. 10 flow chart's step of processing evacuated objects' references.
Figure 11B:
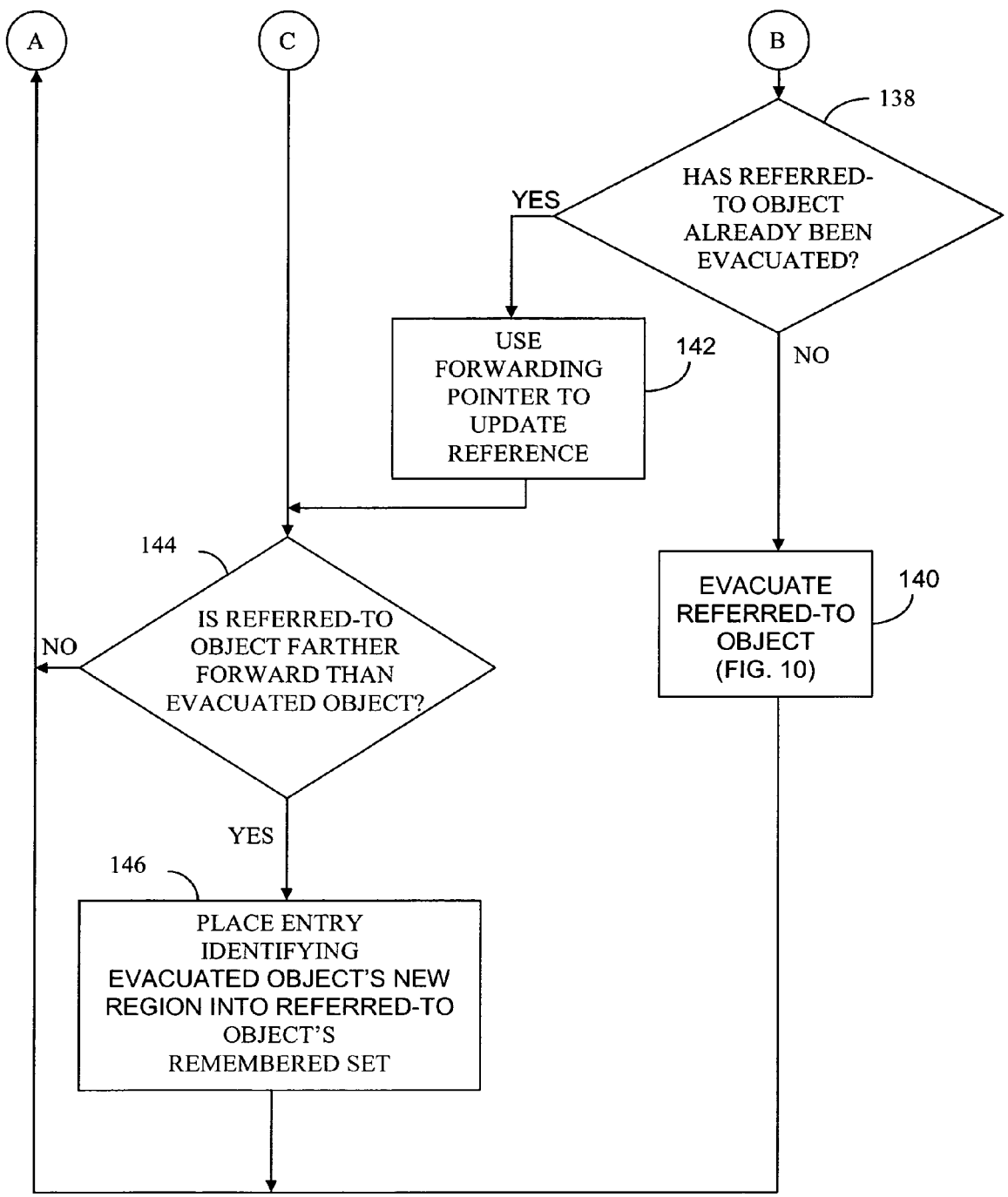
Figure 12A:
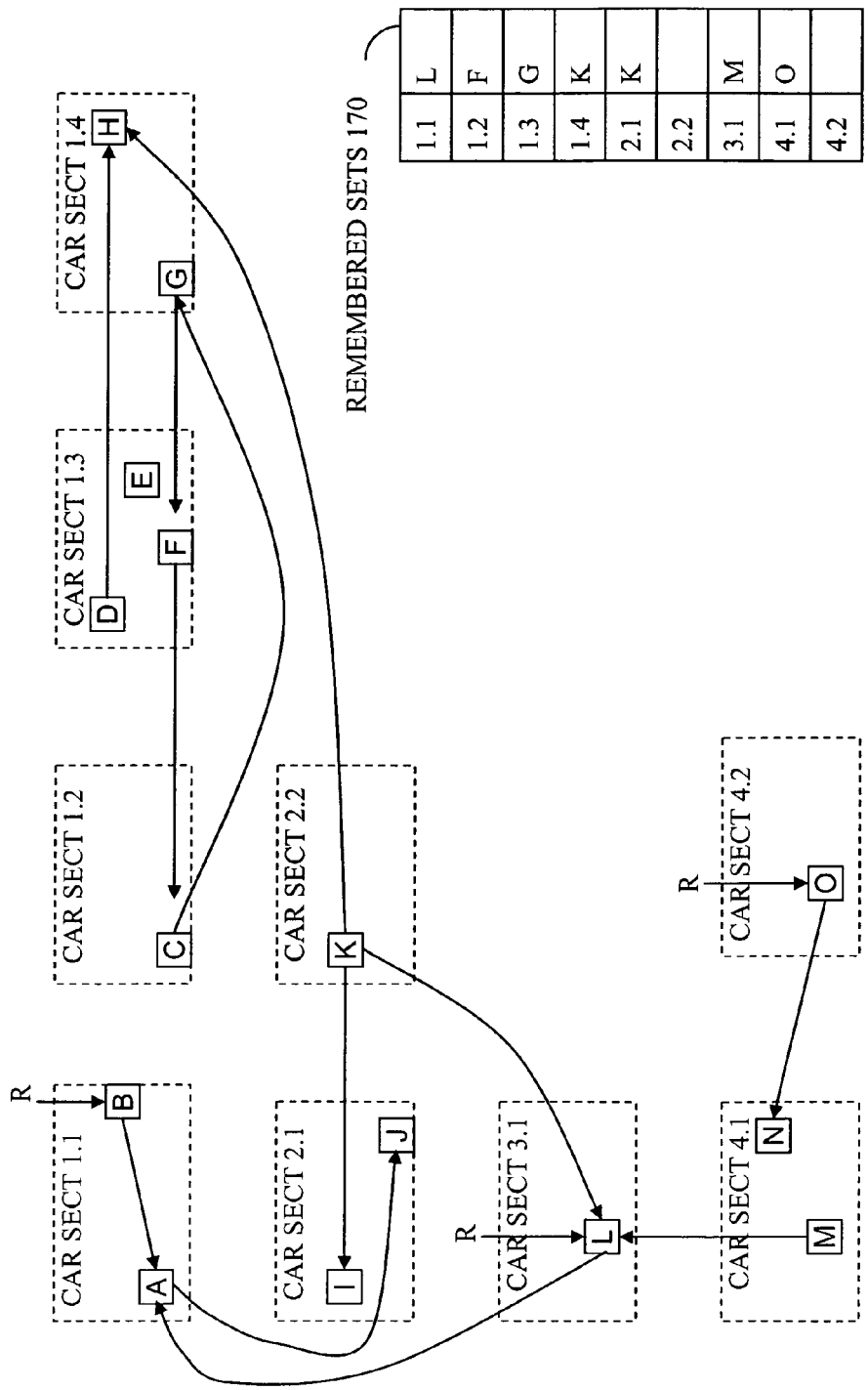
Figure 12B:
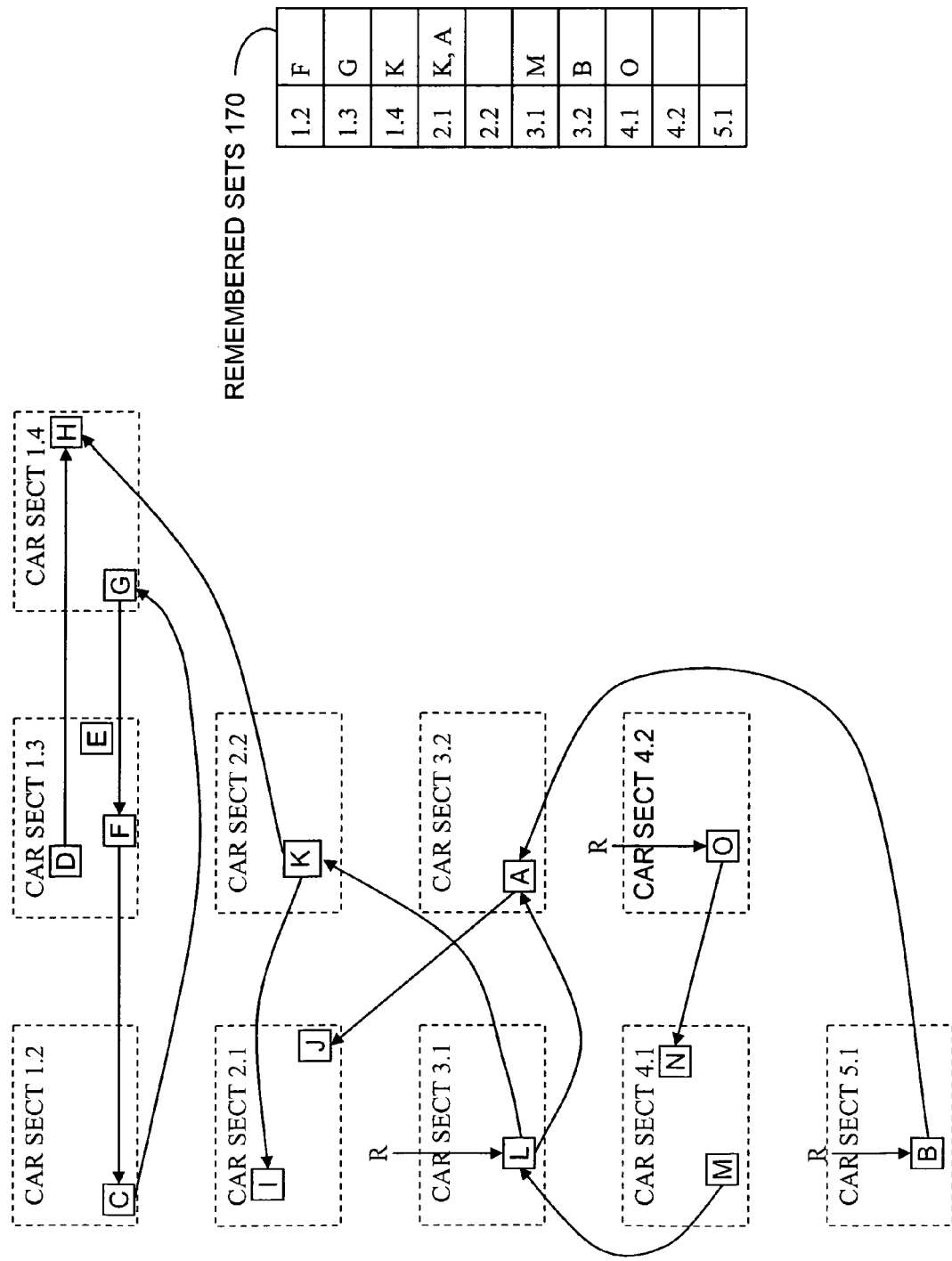
Figure 12C:
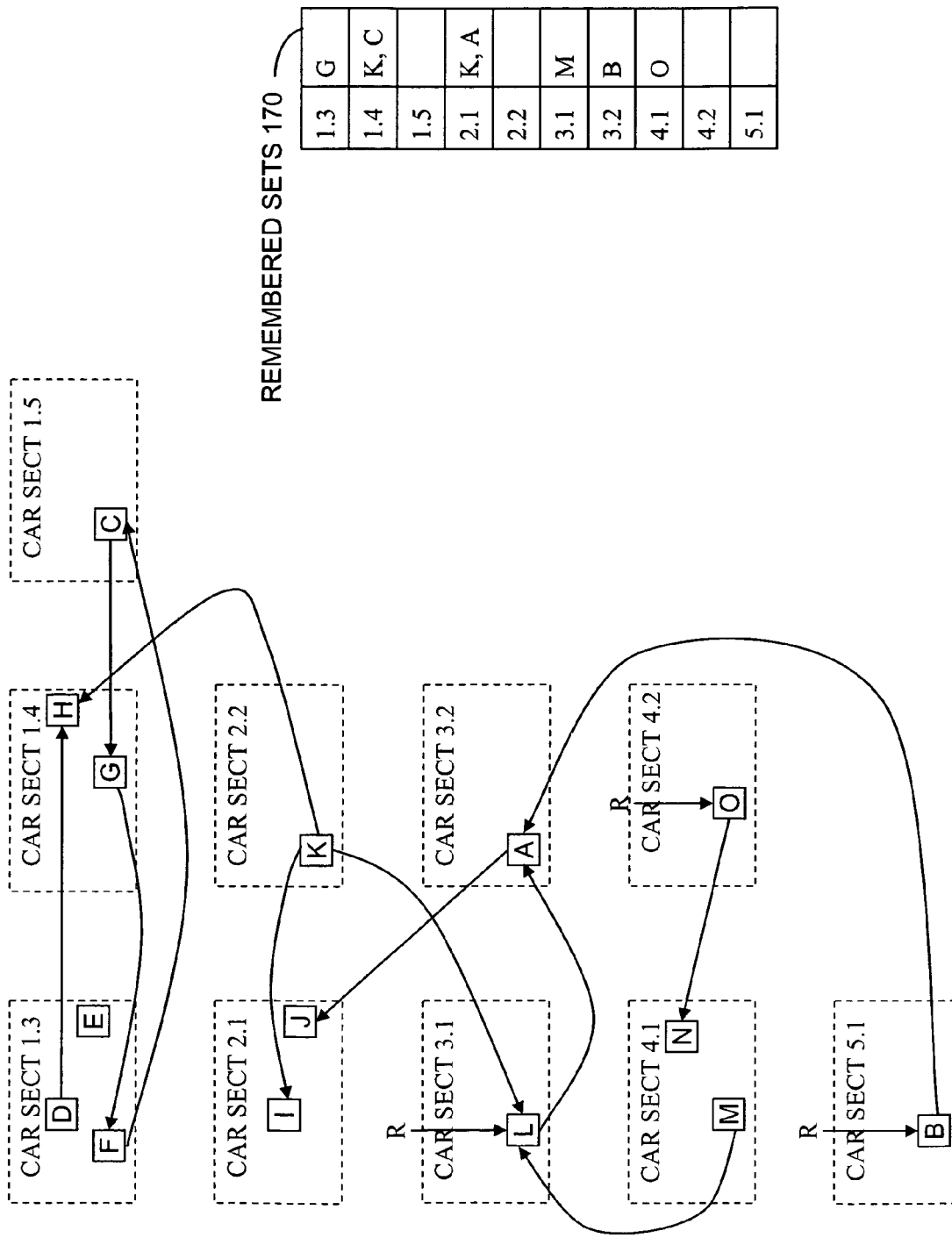
Figure 12D:
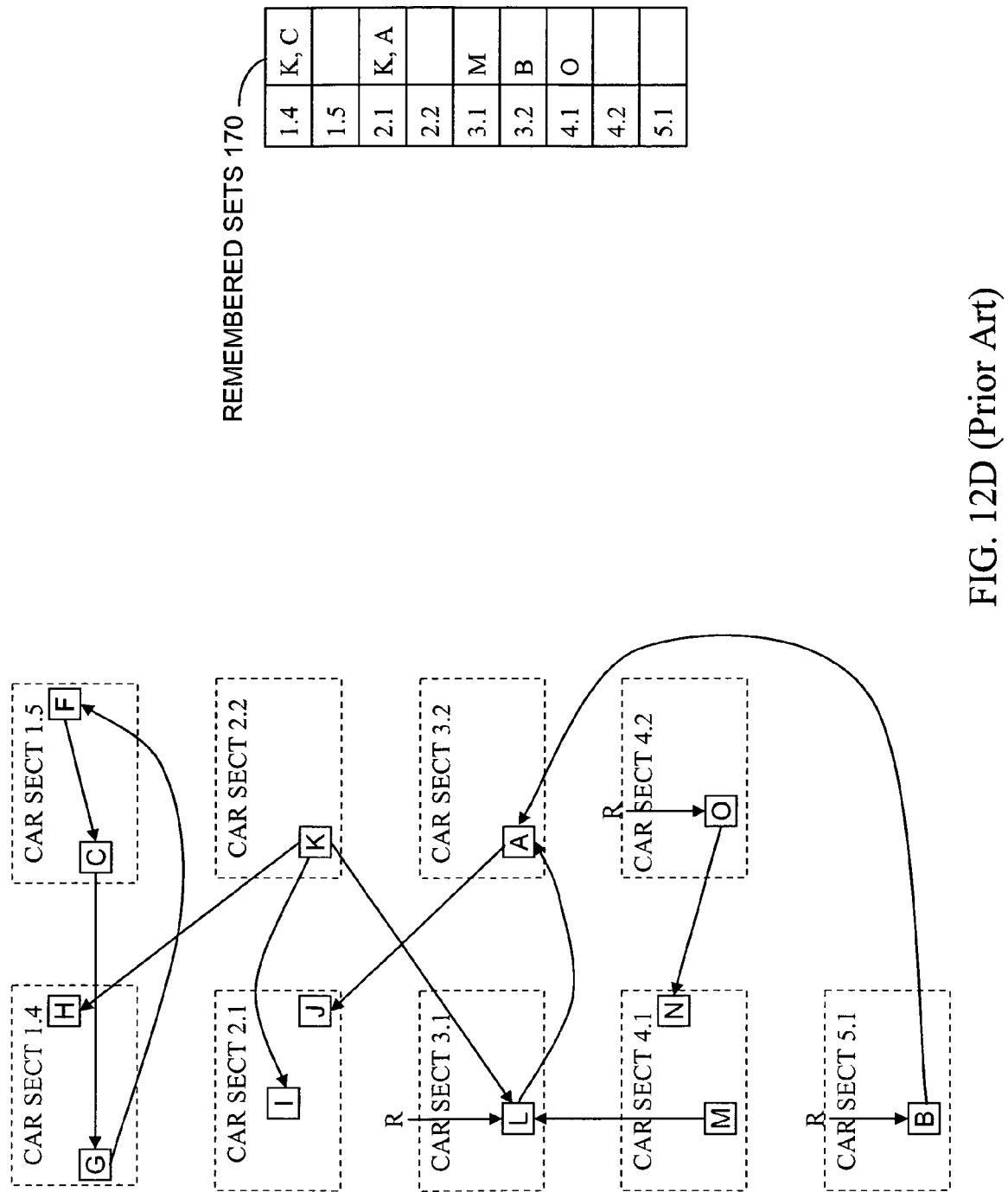
Figure 12E:
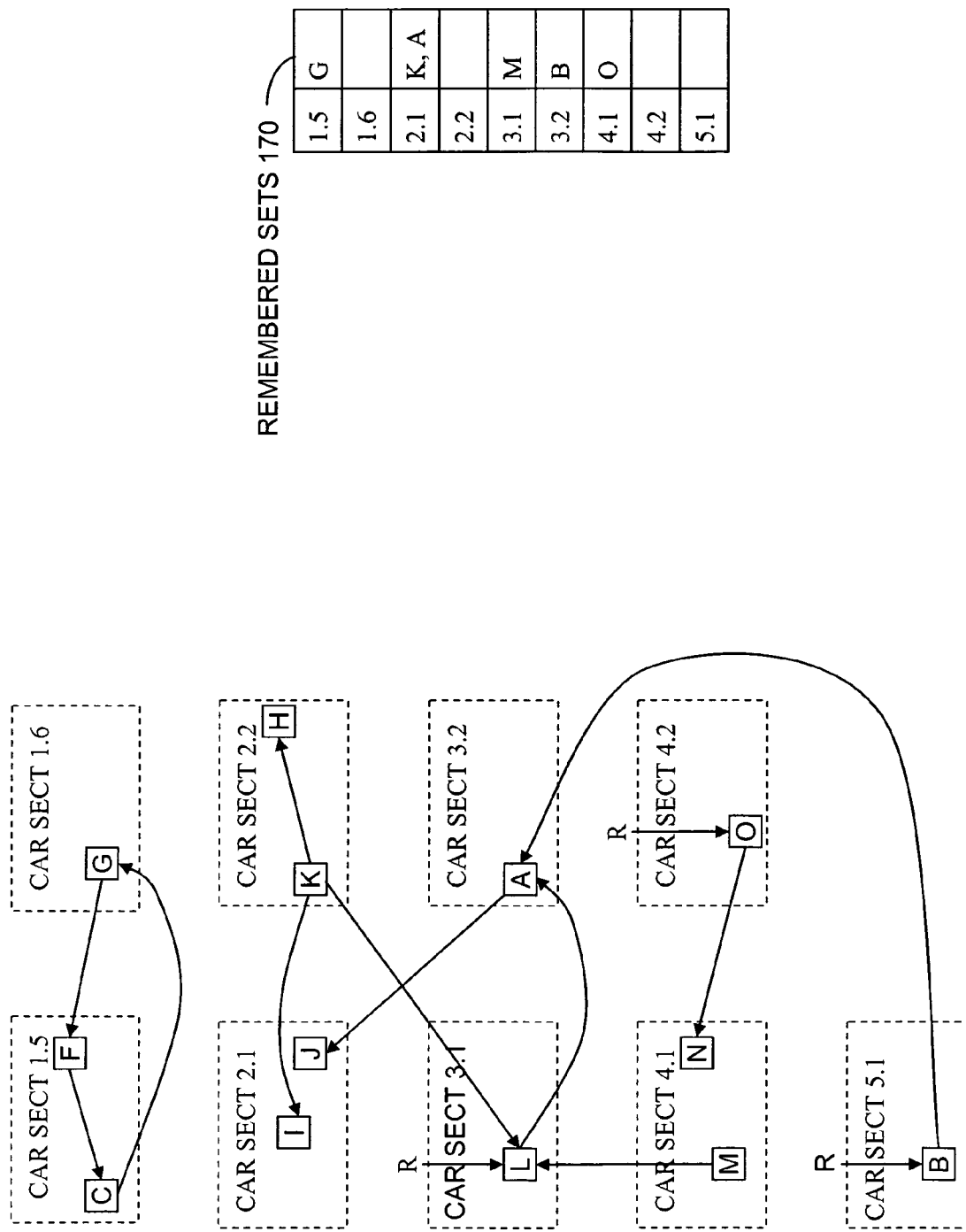
Figure 12F:
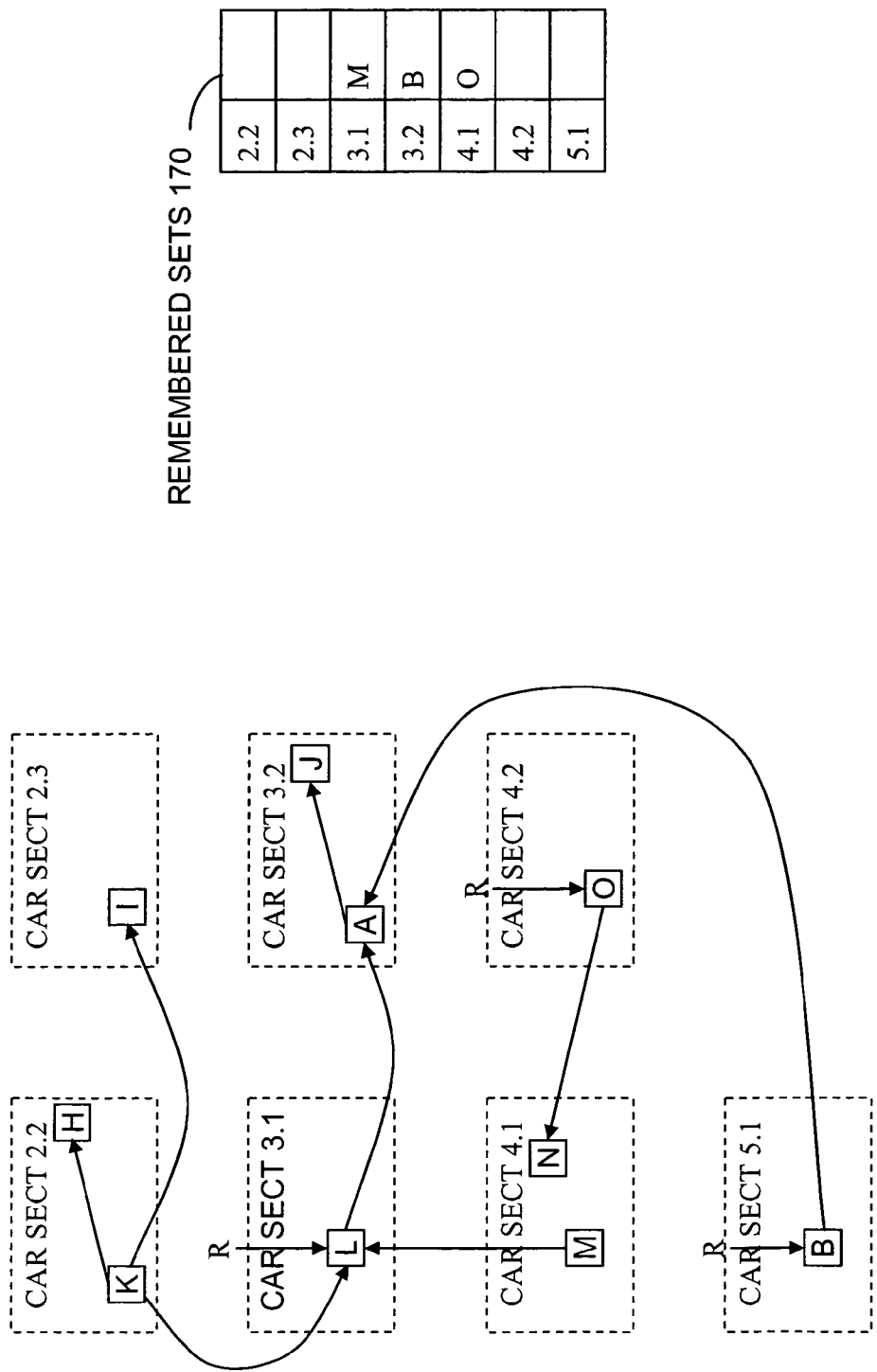
Figure 13A:
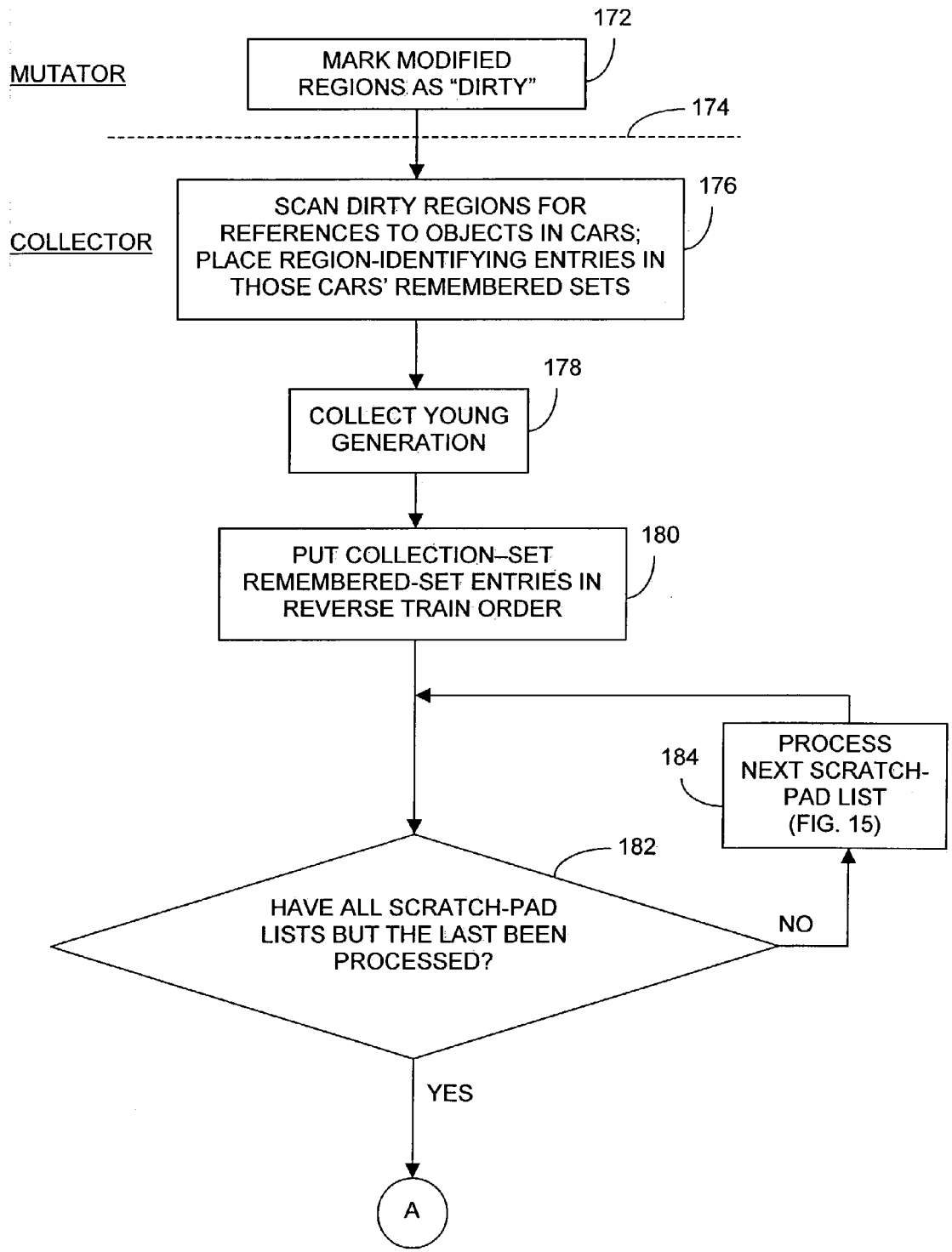
FIGS. 13A and 13B together constitute a flow chart that illustrates a garbage-collection interval whose old-generation collection includes certain optimizations that the old-generation collection depicted in FIGS. 8A and 8B does not.
Figure 13B:
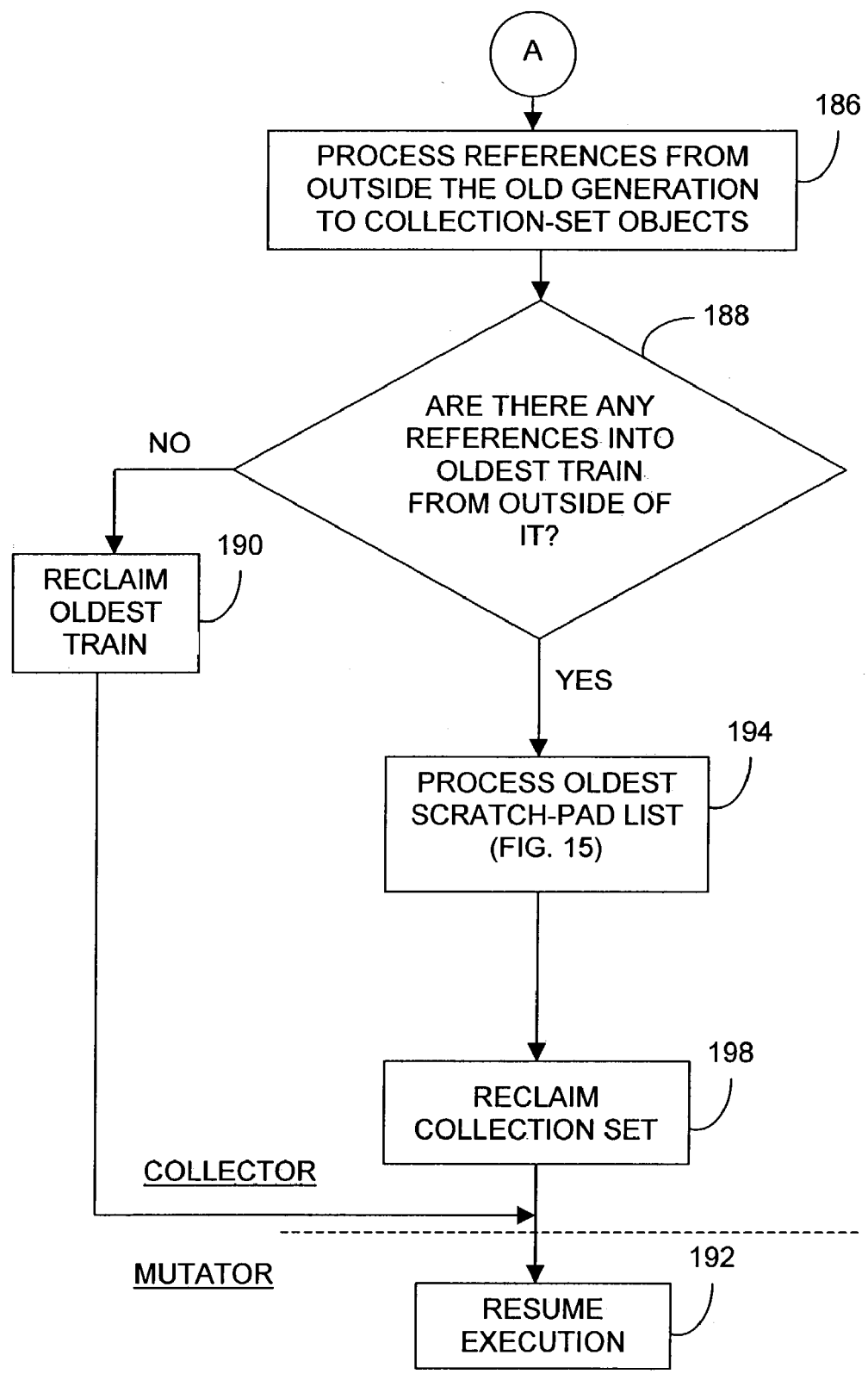

Although the present invention's applicability is not limited to garbage collectors that implement the train algorithm, such collectors can benefit from its teachings. Also, although it does not employ the strictly depth-first evacuation that FIGS. 9–11 exemplify, it can be implemented in a collector whose overall operational sequence is the one that FIG. 8 depicts. But it will instead be exemplified below in a collector whose operational sequence is the one that FIGS. 13A and 13B (together, "FIG. 13") depict.

For the sake of simplicity, FIG. 13 depicts an arrangement that, as the one depicted in FIG. 8 does, divides that application's execution between mutator intervals and collector intervals, each old-generation collection increment occurring entirely within one interval. Those skilled in the art recognize, though, that the train algorithm can be employed in a different manner; the mutator and collector can be executed in parallel threads, for instance, and, even if they are not, a collection increment does not need to occur entirely within a single collector interval. Although the FIG. 13 sequence implements the train algorithm, it admits of the possibility of more than one collection-set car in a given collection increment, whereas single-car increments were tacitly assumed in connection with FIG. 8. Also, the FIG. 13 sequence incorporates certain optimizations that the FIG. 8 sequence does not.

Blocks 172, 176, and 178 represent operations that correspond to those that FIG. 8's blocks 102, 106, and 108 do, and dashed line 174 represents the passage of control from the mutator to the collector, as FIG. 8's dashed line 104 does. (For the sake of simplicity, FIG. 13 depicts an arrangement that, as the one depicted in FIG. 8 does, divides that application's execution between mutator intervals and collector intervals, each old-generation collection increment occurring entirely within one interval. Those skilled in the art recognize, though, that the train algorithm can be employed in a different manner; the mutator and collector can be executed in parallel threads, for instance, and, even if they are not, a collection increment does not need to occur entirely within a single collector interval.) For the sake of efficiency, though, the collection operation of FIG. 13 includes a step represented by block 180. In this step, the collector reads the remembered set of each car in the collection set to determine the location of each reference into the collection set from a car outside of it, it places the address of each reference thereby found into a scratch-pad list associated with the train that contains that reference, and it places the scratch-pad lists in reverse-train order. As blocks 182 and 184 indicate, it then processes all scratch-pad lists but the one associated with the oldest train. After the discussion of the illustrated embodiment's overall operational sequence, we will return to block 184's scratch-pad-list processing, to which the illustrated embodiment applies the present invention's teachings.

Before the collector processes references in the oldest train's scratch-pad list, it evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, it is necessary only to scan older generations, of which there are none in the example; i.e., some embodiments may not require that the young generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train each collection-set object to which a reference in the thus-evacuated object refers. In any case, the collector updates the reference to the evacuated object.

When the inter-generational references into the generation have thus been processed, the garbage collector determines whether there are any references into the oldest train from outside that train. If there are none, the entire train can be reclaimed, as blocks 188 and 190 indicate.

As block 192 indicates, the collector interval typically ends when a train has thus been collected. If the oldest train cannot be collected in this manner, though, the collector proceeds to evacuate any collection-set objects referred to by references whose locations the oldest train's scratch-pad list includes, as block 194 indicates. It removes them to younger cars in the oldest train, again updating references, avoiding duplicate evacuations, and evacuating any collection-set objects to which the evacuated objects refer. When this process has been completed, the collection set can be reclaimed, as block 198 indicates, since no remaining object is referred to from outside the collection set: any remaining collection-set object is unreachable. The collector then relinquishes control to the mutator.

We now return to the scratch-pad-list processing that blocks 184 and 194 represent. Here, instead of performing a strictly depth-first evacuation sequence, the collector employs the present invention's teachings of following a breadth-first sequence that is modified in such a way as to enhance collocation. In this technique the "to space"—i.e., the memory portion to which objects are to be evacuated—is divided for purposes to be described below into segments, which we will refer to as local-allocation buffers ("LABs"). Since the illustrated embodiment employs the train algorithm, the to space has already been divided for other reasons into car sections, and car sections may be used as LABs. In the illustrated embodiment, though, the car sections are divided into multiple LABs. For example, a normal car section may be 64 kilobytes in size and divided into four 16-kilobyte LABs.

Figure 14:
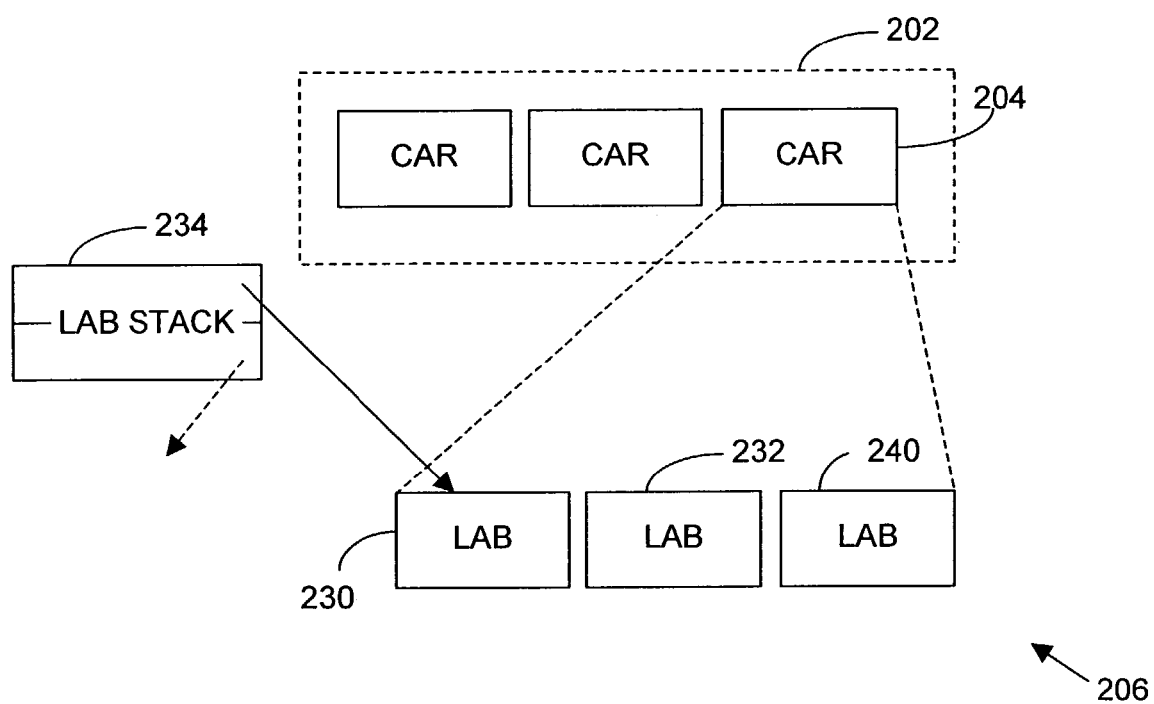
FIG. 14 is a data-structure diagram that illustrates the division of a car section into LABs.
Figure 15:
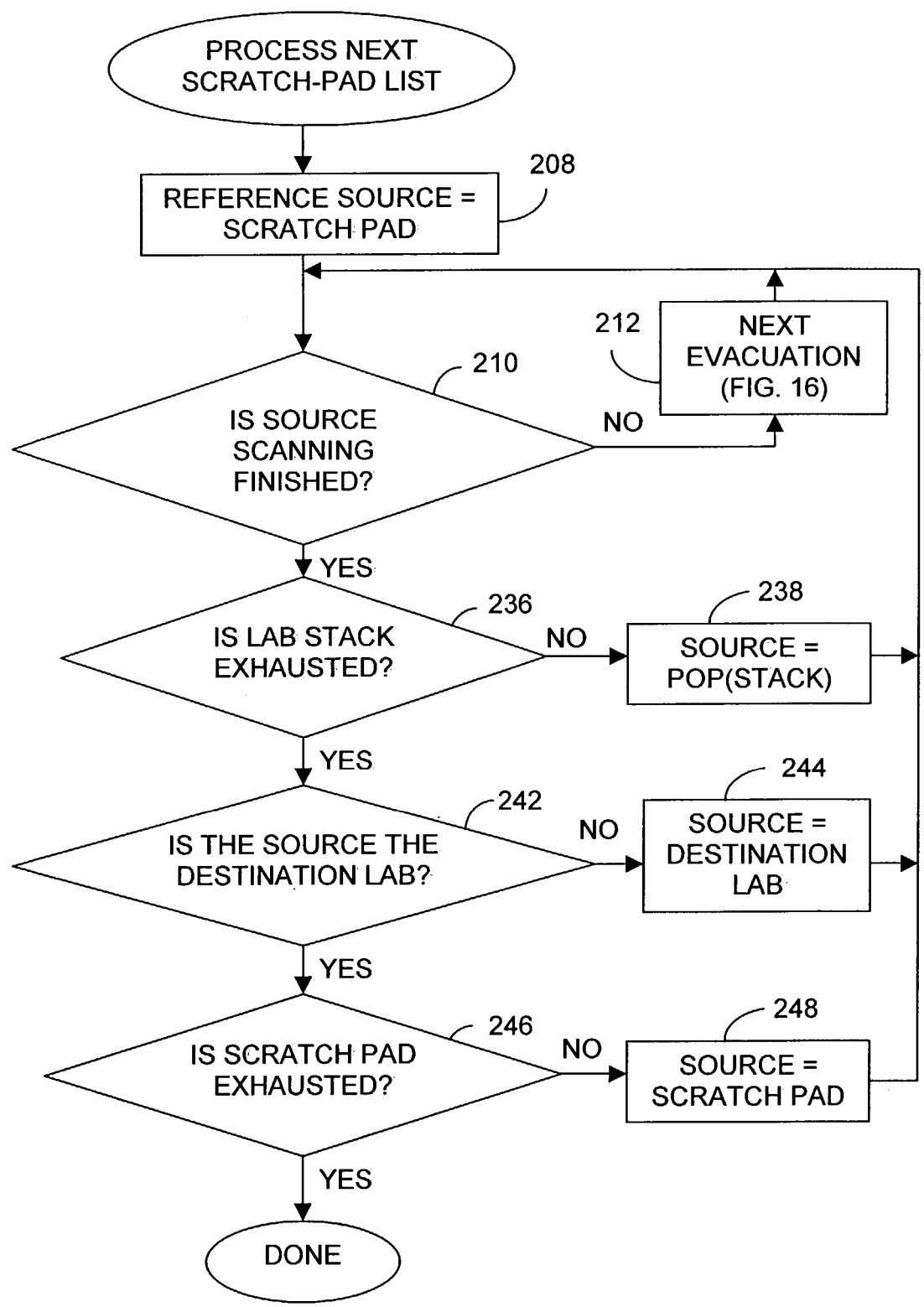
FIG. 15 is a flow chart that depicts FIG. 13B's scratch-pad-list-processing step in more detail.

FIG. 14 is a diagram of a train 202 in which the last car 204 is depicted as organized into a plurality of LABs 206. As was explained above, the collector will have divided the collection set's remembered set into scratch-pad lists of locations where references to collection-set objects are potentially to be found in the respective trains. FIG. 15 is a flow chart of a routine for processing a scratch-pad list such as the one associated with FIG. 14's train 202.

Processing the scratch-pad list involves finding references to collection-set objects and evacuating those objects to train 202's cars, such as car 204. As was also explained above, it additionally involves evacuating to those cars any collection-set objects referred to by references in objects already evacuated. So the references can be thought of as being drawn from two sources: the scratch pad and the evacuee objects.

Figure 16:
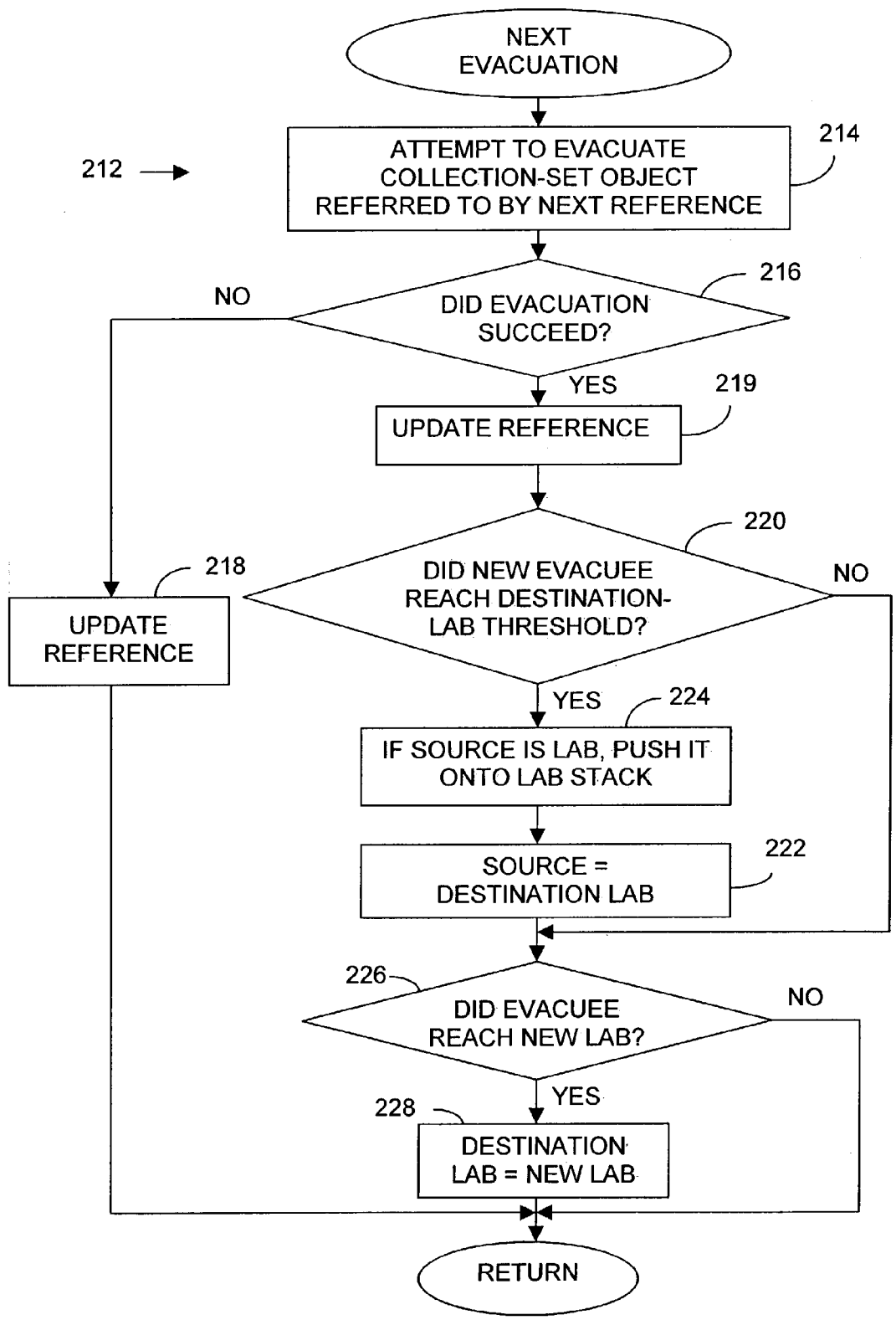
FIG. 16 is a flow chart that depicts FIG. 15's evacuation step in more detail.

In FIG. 15, block 208 represents initially adopting the train's scratch-pad list as the reference source. So long as the reference source still contains references to collection-set objects, the collector continues the evacuation process, as blocks 210 and 212 indicate. FIG. 16 depicts in greater detail the evacuation process that FIG. 15's block 212 represents. To avoid unnecessary complexity, it omits certain of the steps, such as those dealing with remembered sets, that previous flow charts included.

Block 214 represents the operation of attempting to copy the referred-to collection-set object from the collection-set car to, say, FIG. 14's car 204. As was explained above, the referred-to object may have been evacuated already. If so, it will not be evacuated again: the evacuation will not succeed. Block 216 represents branching on whether the evacuation was successful. If it was not, a forwarding pointer will have been left in the already-evacuated object's previous location, and, as block 218 indicates, the collector will simply update the reference without duplicating the evacuation of the object to which it refers. If the evacuation was successful, the object will have been added to one of the LABs 206 into which the car 204 has been divided, so the reference will be updated to reflect the new location, as block 219 indicates.

Now, some causes of low-level latency, such as page faults and cache misses, tend to occur less frequently if references are located near objects to which they refer. So the size of a LAB will preferably be that of a virtual-address page or a multiple thereof, and the collector will attempt to place into a given LAB the evacuated objects referred to by other evacuated objects in the same LAB.

To this end, the collector assigns each LAB a fill factor. FIG. 17 illustrates a situation in which evacuee objects have not yet filled a LAB ("destination LAB") up to a threshold ("t/h") specified by the LAB's fill factor. So long as this situation prevails, the collector will continue filling that LAB with objects referred to by references in the current reference source. In most implementations, the collector will associate with each LAB a pointer to the location ("lim") where the next object should be placed in that LAB. When the location specified by this pointer reaches the fill threshold, the destination LAB additionally becomes the source LAB, as FIG. 18 illustrates. That is, objects thereafter evacuated into that LAB are ones to which references in the same LAB refer. To keep track of scanning progress, the collector will typically associate with a source LAB a pointer to the location ("scan") of the object next to be scanned in that LAB.

FIG. 16's block 220 represents the operation of determining whether the destination LAB has been filled to the fill threshold, and block 222 represents adopting the destination LAB as the source LAB if it has. (Those two blocks are separated by a block, block 224, whose purpose will be discussed below.) For the moment, let us stay with the scenario in which an object has just been evacuated in response to the first reference that the scratch-pad list identifies. In such a situation, the outcome of the block 220 test will most frequently be negative: that first evacuee object will not occupy the destination LAB to the fill level. It therefore will not have reached a new LAB, so the outcome of the block 226 step will be negative. The collector therefore will not execute block 228's step of adopting a new destination LAB; the routine will simply return, and, as FIG. 15's blocks 210 and 212 indicate, the collector will loop back to the FIG. 16 routine to evacuate the next object.

Let us assume that repetition of this loop causes the destination LAB to be filled to its fill threshold, which may be, say, 60%. When this happens, the reference source becomes the evacuee objects previously placed in that LAB, as FIG. 16's block 222 indicates and FIG. 18 illustrates. The collector scans these objects for references to collection-set objects and evacuates any it thereby finds. If the fill factor has been chosen optimally, the LAB will just be completely filled by evacuation of the last such "descendant" collection-set object into it, as FIG. 19 illustrates. More typically, the descendants either will not completely fill the LAB or, as FIG. 20 illustrates, will spill over into the next LAB. Let us assume that they spill over into LAB 232 so that, as FIG. 16's blocks 226 and 228 indicate, it becomes the new destination LAB.

Let us further assume that continued evacuation of objects referred to by references in LAB 230 cause LAB 232 to reach its own fill threshold, and therefore become the new source LAB, before all of LAB 230's evacuee objects have been scanned for references. LAB 230 is no longer the source LAB, but it has not been scanned completely, either. So the collector needs to remember to come back to LAB 230 to complete the job. LAB 230 therefore gets placed on a LAB stack, as FIG. 16's block 224 indicates, when LAB 232 takes over as the new source.

The mechanics of that stack's implementation are not critical. One possibility is to employ an explicit stack. FIG. 14's stack 234 represents this possibility. The stack's entries can be pointers to respective LABs. Or the entries can be pointers to the first unscanned objects in those LABS; if the LABs are appropriately aligned and sized, the LAB's location would be implicit. Alternatively, the stack could be maintained as a linked list threaded through, say, the LAB's first or last words, or through the collection-set locations from which objects were evacuated to the LAB. The list's head could be, say, located in the metadata for the train whose scratch-pad list is being processed or, in a multi-threaded environment, in the execution environment of the thread that "owns" the stack.

As FIG. 16's block 222 indicates, the collector then adopts the destination LAB (say FIG. 14's LAB 232) as the source LAB and begins scanning references in objects that LAB contains and evacuating the referred-to collection-set objects into it. This time, though, let us assume that the scanning of all such objects in LAB 232 for references into the collection set is completed before LAB 232 is completely filled. When that happens, the test represented by FIG. 15's block 210 will yield an affirmative result: the scanning of the source, which at this point is the objects in FIG. 14's LAB 232, is finished. As FIG. 15's blocks 236 and 238 indicate, therefore, the collector pops the LAB stack. That is, the source again becomes FIG. 14's LAB 230. As was mentioned above, the stack entry that the collector pops may be a pointer to the first unscanned object. Alternatively, it may be a pointer to LAB 230, and a scan pointer associated with that LAB may identify the unscanned-object boundary. In any event, scanning then proceeds, and the collection-set objects identified by references in LAB 230's scanned objects are evacuated to LAB 232.

This further scanning of LAB 230's objects and the resultant evacuation into LAB 232 may exhaust LAB 230's references to collection-set objects. If so, then last-in, first-out retrieval from the LAB stack has resulted in collocation of objects and all their descendants in the two-LAB memory block consisting of LABs 230 and 232. For the sake of illustration, though, we will assume instead that the further scanning of LAB 230's objects results in evacuation of more objects than the remaining space in LAB 232 can contain and that LAB 230 is not exhausted until a small number of evacuee objects end up in LAB 240.

When the test represented by FIG. 15's block 210 again indicates that the reference source has been exhausted, the block-236 test is affirmative: this time, the LAB stack has been exhausted, too. So the collector proceeds to the test that block 242 represents. Since the source LAB is LAB 230 and the destination LAB is LAB 240, that test yields a negative result, so the collector performs the block-244 step of adopting LAB 240 as the source LAB. That is, it begins scanning the evacuee objects that LAB 240 contains.

Now assume that those evacuee objects and all of their descendants fit into a relatively small space within LAB 240. The scanning of LAB 240 as a source therefore ends soon: the result of FIG. 15's block-210 test is soon affirmative again. In the scenario described so far, the LAB stack remains exhausted, so the result of the block-236 test is affirmative. So is that of the block-242 test: the references searched have been in LAB 240, and the destination for the resultant evacuations has been that LAB, too. As blocks 246 and 248 indicate, therefore, the collector returns to the scratch-pad list to find locations of further references to collection-set objects. The operation then continues until the collector has scanned all of the locations that the scratch-pad list identifies as well as all references in the objects evacuated as a result.

In some embodiments, a common, fixed fill level will be employed for all LABs. But other embodiments may assign different fill levels to different LABs. A collector that places objects into different cars in accordance with those objects' classes, for instance, may take object class into account in choosing the fill level. For example, if the collector uses a given car exclusively for objects that contain no references, then the fill level for LABs in that car may be one hundred percent. So may the fill level for LABs in cars that exclusively contain objects whose references refer only to objects that contain no references. On the other hand, the fill levels for LABs in cars whose objects likely have long reference chains will be assigned relatively low fill levels.

Also, some embodiments may adjust fill level either at compile time or at run time in accordance with experience. In a run-time adjustment, for example, the fill level to be assigned to the next LAB may, say, be increased when the descendants of a LAB's objects do not overflow its bounds and be decreased when they do.

Employing LAB stacks not only enhances the collector's collocation properties but also facilitates load balancing in multi-threaded collection. Particularly in computer systems that include multiple parallel-executing processors, collectors are sometimes arranged to be multi-threaded. In such collectors, an evacuation operation such as that of processing scratch-pad lists may be divided among a plurality of threads, which will typically be executing on different ones of the computer system's processors. To implement an operation such as the one that FIG. 15 depicts, each of the parallel threads would be assigned a respective LAB as its own destination LAB, and it would also be assigned a respective set of the scratch-pad list's entries. Preferably, the scratch-pad list is divided into more entry sets than there are threads; a thread that has finished its entry set before the others can thereby have a further set to process. Once the scratch-pad list is exhausted, though, a thread that has run out of references to be processed can attempt to "steal" a LAB from another thread. That is, if another thread has a LAB on its LAB stack, the thread that has run out of work can pop that stack and adopt the LAB thereby popped as its own source LAB.

Figure 21:
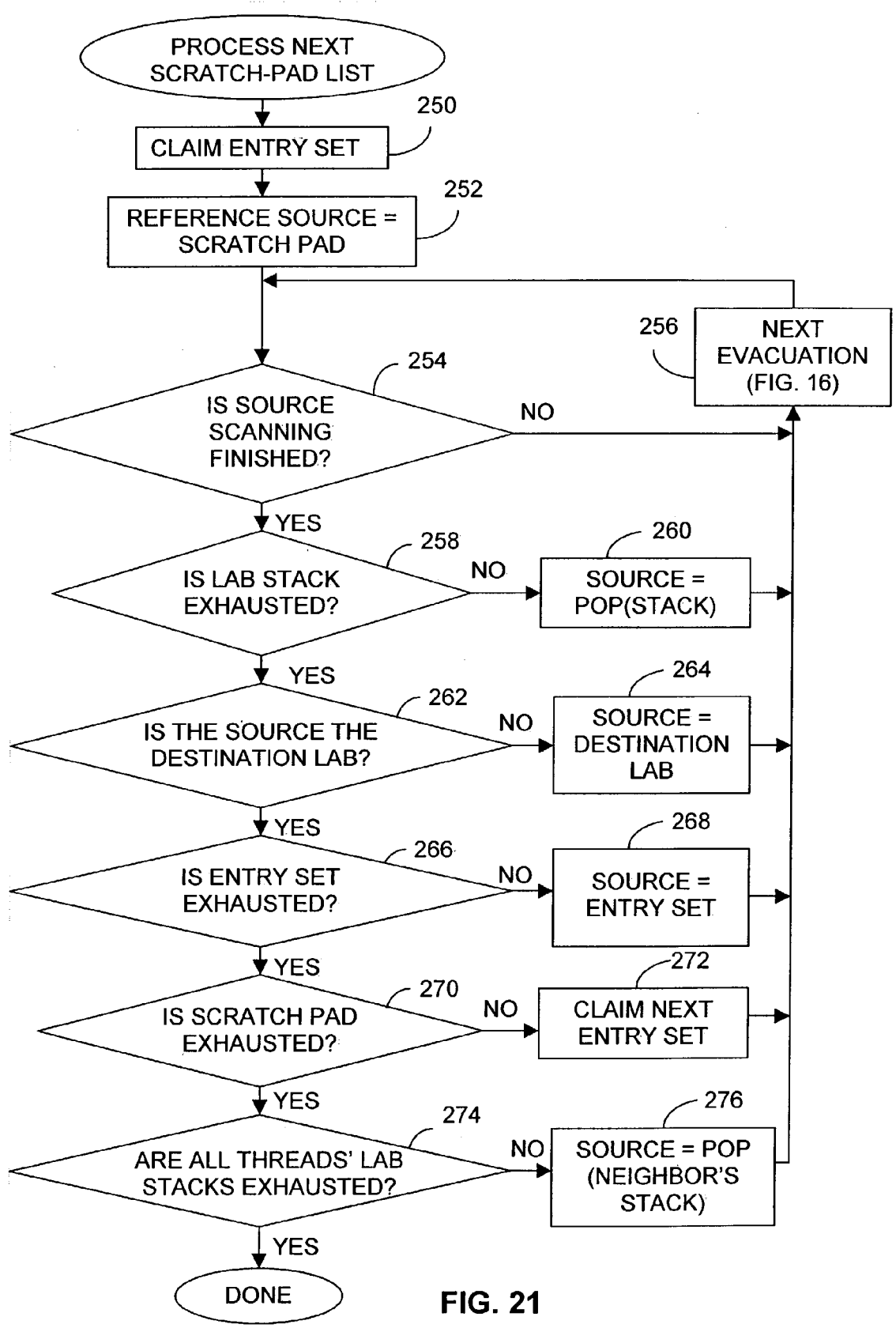
FIG. 21 is a flow chart depicting a routine similar to that of FIG. 15 but additionally including provisions for enabling a thread to "steal" a LAB's worth of work from another thread.

FIG. 21 depicts a routine that an individual thread may employ to process a scratch-pad list. As block 250 indicates, it starts by claiming one set of the entries in the scratch-pad list associated with the current train. Blocks 252, 254, 256, 258, 260, 262, and 264 represent operations that are essentially the same as those represented by corresponding blocks in FIG. 15. When its performance of those operations results in the collector thread's finding that the objects it has evacuated contain no more references to unevacuated collection-set objects, the thread returns to its claimed set of scratch-pad-list entries if any remain, as blocks 266 and 268 indicate. When that set has been exhausted, the thread claims a further one if any remain, as blocks 270 and 272 indicate.

When no further scratch-pad-list entries remain, though, the thread determines whether it can "steal" from any other thread's LAB stack. Any of the common mechanisms for making such a determination can be used. One such mechanism is to use a common activity counter, which all of the threads increment and decrement. The counter's initial count equals the number of threads. This means that all threads are occupied. When a thread reaches a point at which it will attempt to steal, it decrements the counter, and it increments the counter when it finds a "victim" thread, one that apparently has LABs on its LAB stack. It then attempts to steal the LAB by employing some mechanism of contending with any other thread concurrently attempting to pop that LAB stack. If it is unsuccessful or otherwise needs to steal again, it decrements the counter. This continues until the counter reaches zero. Since the counter can reach zero only when all threads are trying to steal and have found no potential victims, the thread can conclude that the parallel operation is over. Of course, other contention mechanisms can be employed instead.

In any event, a successful steal results, as blocks 274 and 276 indicate, in the thread's adopting the stolen LAB as its source LAB. The evacuation operation then continues. When the thread concludes that no further stealing is possible, the scratch-pad-list processing is done.

The routine just described performs stealing in units of LABs. This approach is advantageous; it tends to carry the present invention's collocation advantages through to the evacuations that occur as a result of stealing. But some embodiments may employ a different unit of stealing, at least in situations in which all threads' LAB stacks are exhausted.

Figure 22A:
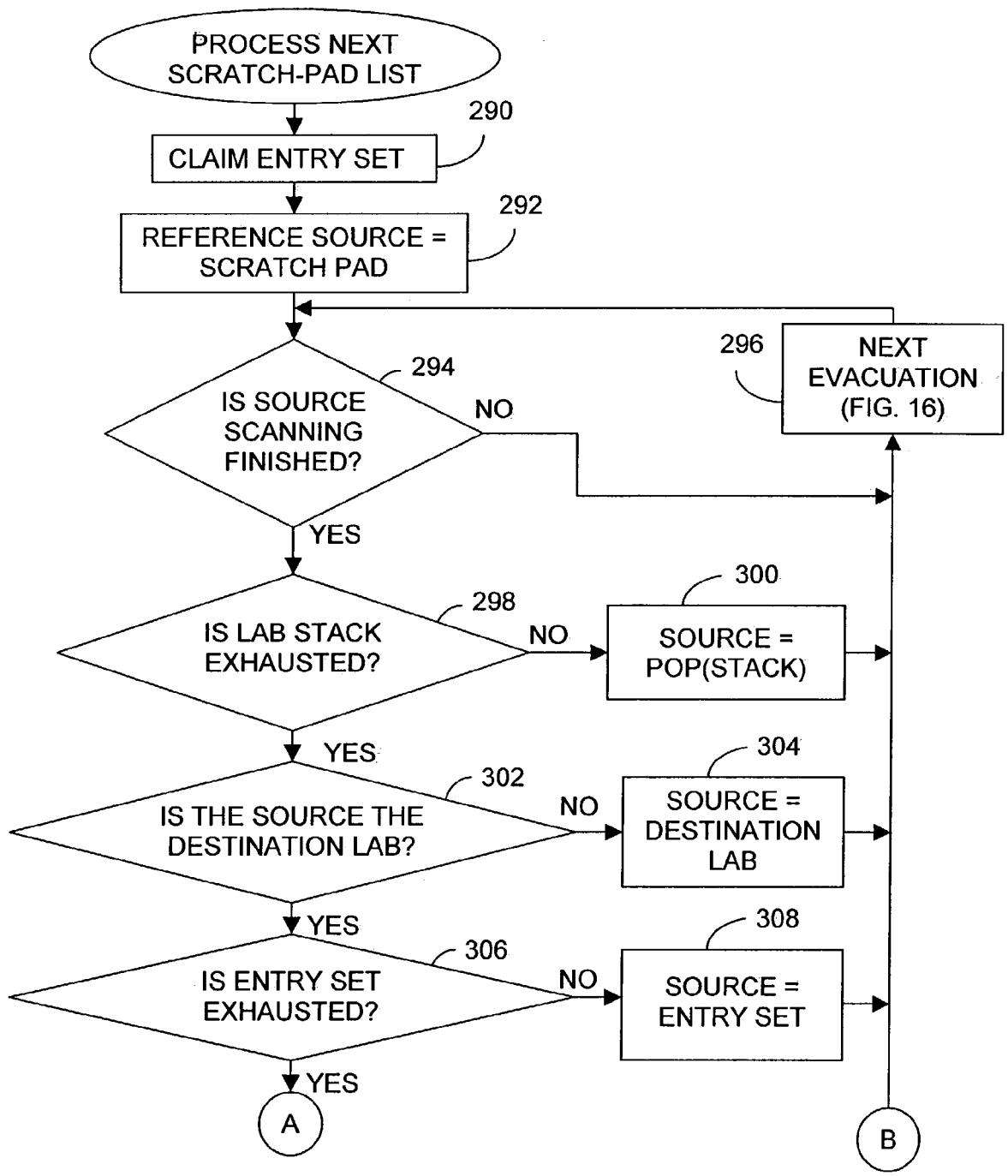
FIGS. 22A and 22B together constitute a flow chart of a routine similar to that of FIG. 21 but arranged additionally to steal individual objects rather than entire LABs in some cases.
Figure 22B:
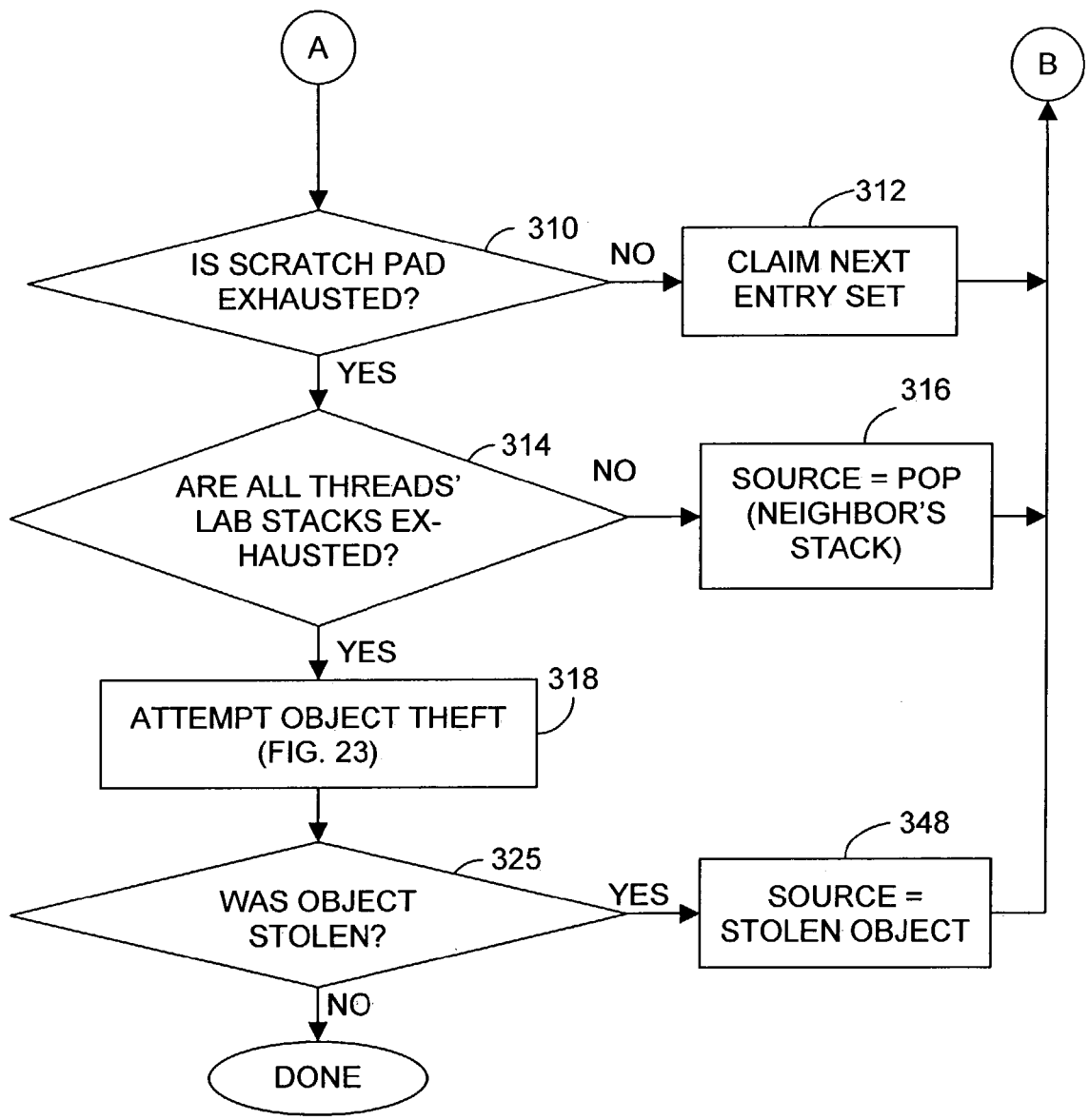
Figure 23A:
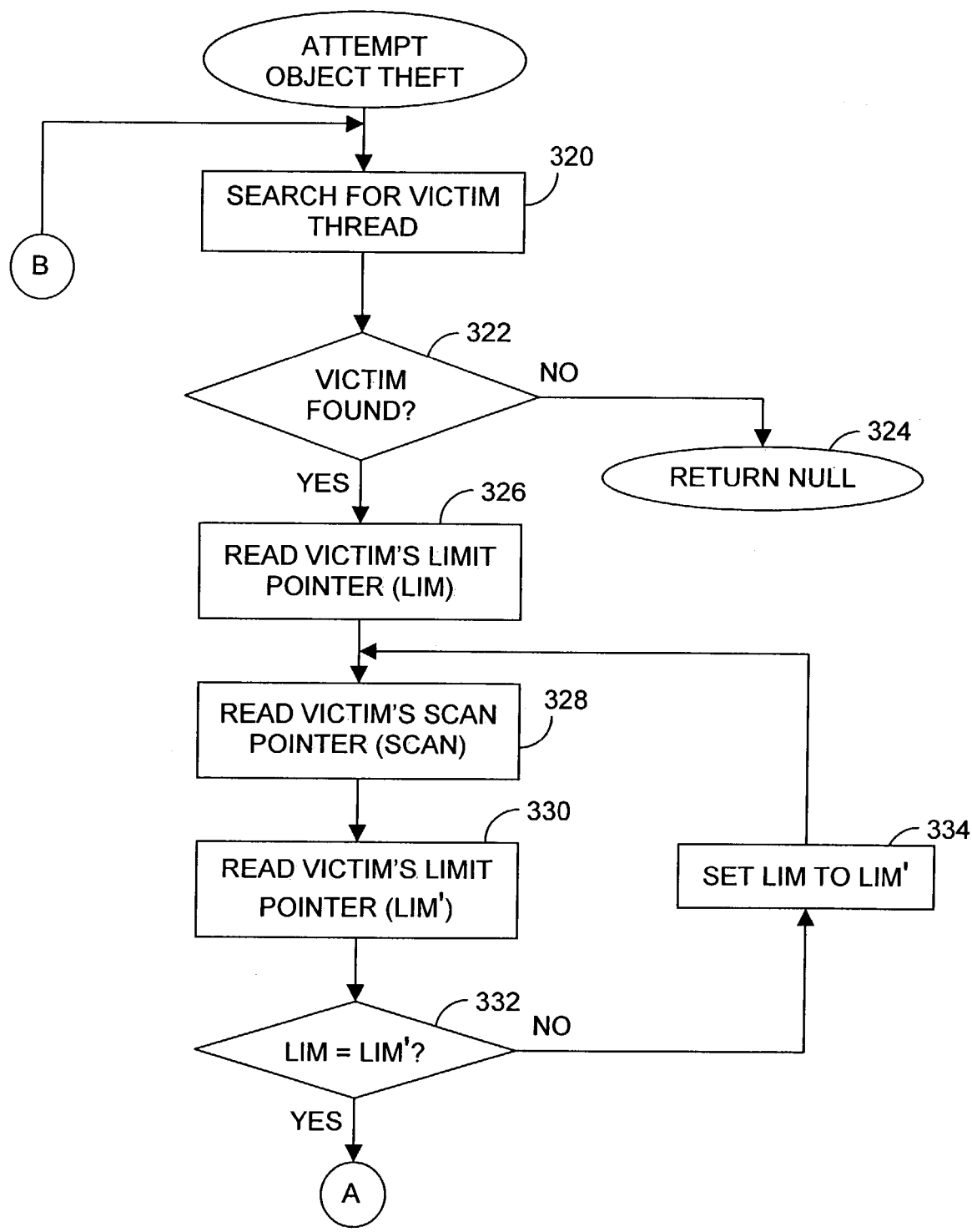
FIGS. 23A and 23B together constitute a flow chart of a routine used by an execution thread to attempt the object theft employed in the routine of FIGS. 23A and 23B.
Figure 23B:
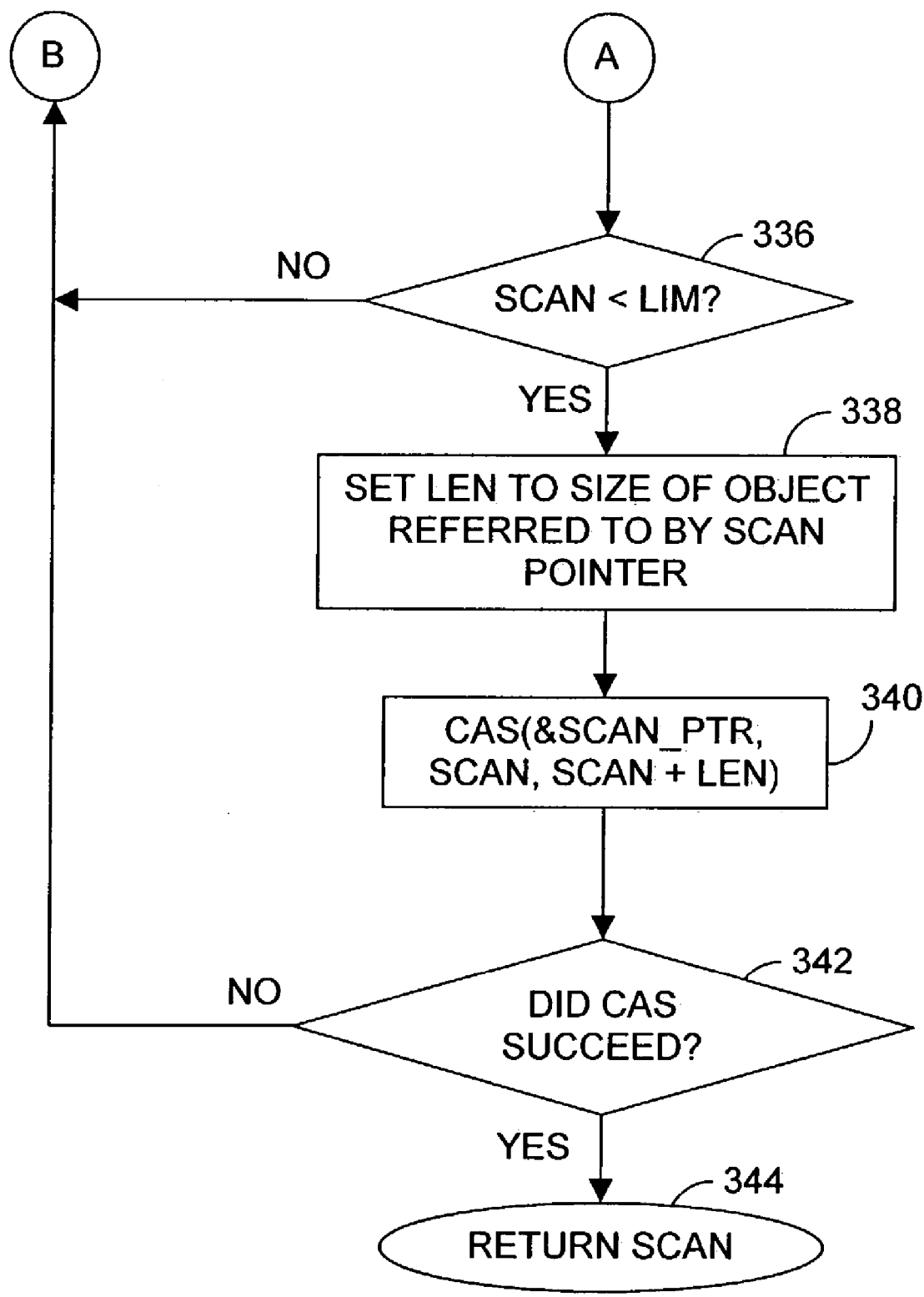

To illustrate this, FIGS. 22A and 22B (together, "FIG. 22") depict a routine that is largely the same as that of FIG. 21. Blocks 290, 292, 294, 296, 298, 300, 302, 304, 306, 308, 310, 312, 314, and 316 represent operations that are essentially identical to those represented by FIG. 21's block 250, 252, 254, 256, 258, 260, 262, 264, 266, 268, 270, 272, 274, and 276, respectively. Whereas the result of an affirmative outcome of FIG. 21's block-274 determination is that the thread completes its processing of the scratch-pad list, though, the result of FIG. 22's corresponding test, represented by block 314, is that the thread attempts to steal an object from another, "victim" thread's object list, i.e., from the LAB that the victim thread is currently using as its source LAB. Block 318 represents making this attempt, which FIGS. 23A and 23B (together, "FIG. 23") depict in more detail.

As block 320 indicates, the routine starts by searching for a victim thread from which to steal an object. If the thread attempting to steal is unable to find a victim, it returns an indication of that fact, as block 322 and 324 indicate. As the negative branch from FIG. 22's block 325 indicates, the thread's execution of the scratch-pad-list processing routine ends in that case.

If the thread does find a victim, it attempts to claim for itself the next unscanned object in the victim's source LAB. In the illustrated embodiment, doing so involves changing the contents of a scan-pointer field (not shown) associated with the victim thread. Each thread in the illustrated embodiment maintains scan- and limit-pointer fields. These contain copies of its source LAB's scan and limit pointers. As was explained above, the scan pointer tells where the thread is to look for the next unscanned object.

More precisely, the scan pointer points to the end of the last object claimed for scanning; the last object thus claimed may also be the last object in the LAB. So the scan pointer may not actually be pointing to a further evacuated object. The stealing thread therefore needs to check for this possibility. Specifically, it needs to determine whether the scan pointer equals the limit pointer; if it does, the LAB's last evacuated object has already been scanned.

But doing so involves a complication that arises from the fact that the owner thread can be in the process of switching to a new source LAB. That complication be appreciated by considering the following example. Suppose that the stealer thread reads the victim thread's limit-pointer field and is about to read that thread's scan-pointer field. But suppose further that the owner thread switches source LABs in the interim and changes the contents of its scan-pointer field in the process to specify a location in the new source LAB rather than in the old source LAB. In this situation, the stealer thread will read a scan-pointer value that identifies a location in the new LAB, whereas the limit-pointer value that it reads identifies a location in the previous LAB. So the stealer thread may arrive at an erroneous conclusion if it compares those two values to determine whether any unscanned objects remain in the victim thread's source LAB.

To avoid such an erroneous result, the illustrated embodiment performs the operations represented by FIG. 23's blocks 326, 328, 330, 332, and 334. Specifically, it reads the victim thread's limit pointer, reads its scan pointer, and then re-reads its limit pointer to determine whether the limit-pointer value has changed. If it has, the thread repeats the step of reading the scan pointer and re-reading the limit pointer. If the limit pointer remains the same, the scan pointer and the limit pointer are values for the same LAB and can reliably be employed to determine whether the location identified by the scan pointer actually holds an evacuated object.

Having thus ensured that it can safely use those two values for that purpose, it performs the operation represented by block 336: it determines whether the scan pointer's value is less than that of the limit pointer. If it is not, the LAB has no unscanned objects left. So the stealer repeats the theft attempt, as the drawing indicates.

Otherwise, the stealer attempts to claim for scanning the object pointed to by the scan pointer. To this end, the stealer thread first reads the class information that the object's header identifies, and it determines the object's size from that information, as block 338 indicates. Adding that size value to the scan-pointer value that the stealer thread has read will yield the address at the end of the object the stealer is attempting to steal, and replacing the victim thread's scan pointer with the resultant value redirects the victim thread around the previously identified object: it claims that object for the stealer thread.

But the claiming operation raises another synchronization problem. After the stealer initially reads the scan pointer, but before it attempts to claim the object thereby identified, the victim thread may itself scan that object and proceed on to scan further objects, updating its scan pointer in the process. If the stealer thread were simply to place the computed new object address into the victim's scan-pointer location, it would cause the victim thread to go back and scan objects that it had already scanned.

To avoid this problem, the stealer performs an operation that block 340 represents. Although a processor most frequently performs reading, comparison, and writing in separate operations, most modern architectures additionally provide the capability of performing some combination of normally separate operations atomically. An example of such an atomic operation is the compare-and-swap operation, in which the processor (1) reads from a target location, (2) compares the target location's contents with an expected value, and (3) only if the value read from the target location was in fact the expected value, writes a replacement value into the target location. Block 340 represents using such an operation to ensure that its claiming of the next evacuated object in the LAB does not corrupt the victim thread's scan-pointer information.

Specifically, the stealer thread atomically (1) reads the scan-pointer value, (2) compares it with the scan-pointer value that it used to compute a replacement scan-pointer value, and (3) only if those two values are the same, replaces the scan-pointer value with the address at the end of the object previously pointed to by the scan pointer. Since the stealer thread performs this operation atomically, there is no possibility that its claiming operation will corrupt the victim thread's scan-pointer information.

The compare-and-swap operation will be unsuccessful if the owner thread (or another stealer) has changed the scan pointer's value since the stealer first read it. As block 342's negative branch indicates, the stealer thread starts over from the beginning of the routine if that happens. Otherwise, the FIG. 23 routine returns the thus-claimed object's address, as block 344 indicates, to the stealer-thread routine that called it. As FIG. 22's block 348 indicates, the stealer thread accordingly proceeds to scan the thus-claimed object's references and evacuate any collection-set descendants it thereby finds.

Although the stealer thread may in some embodiments evacuate the stolen object's descendents to the victim thread's destination LAB, synchronization considerations make it preferable for any such descendants to be evacuated to the stealer thread's destination LAB, despite the resultant lower level of collocation.

Note that the general approach depicted by FIG. 23 can be used to claim more than a single object at a time. For example, the operation represented by block 338 could instead add several successive objects' lengths to the scan pointer's value. Or the replacement value employed in block 340's compare-and-switch operation could be the limit pointer: the stealer thread could steal all of the source LAB's remaining objects.

Figure 24A:
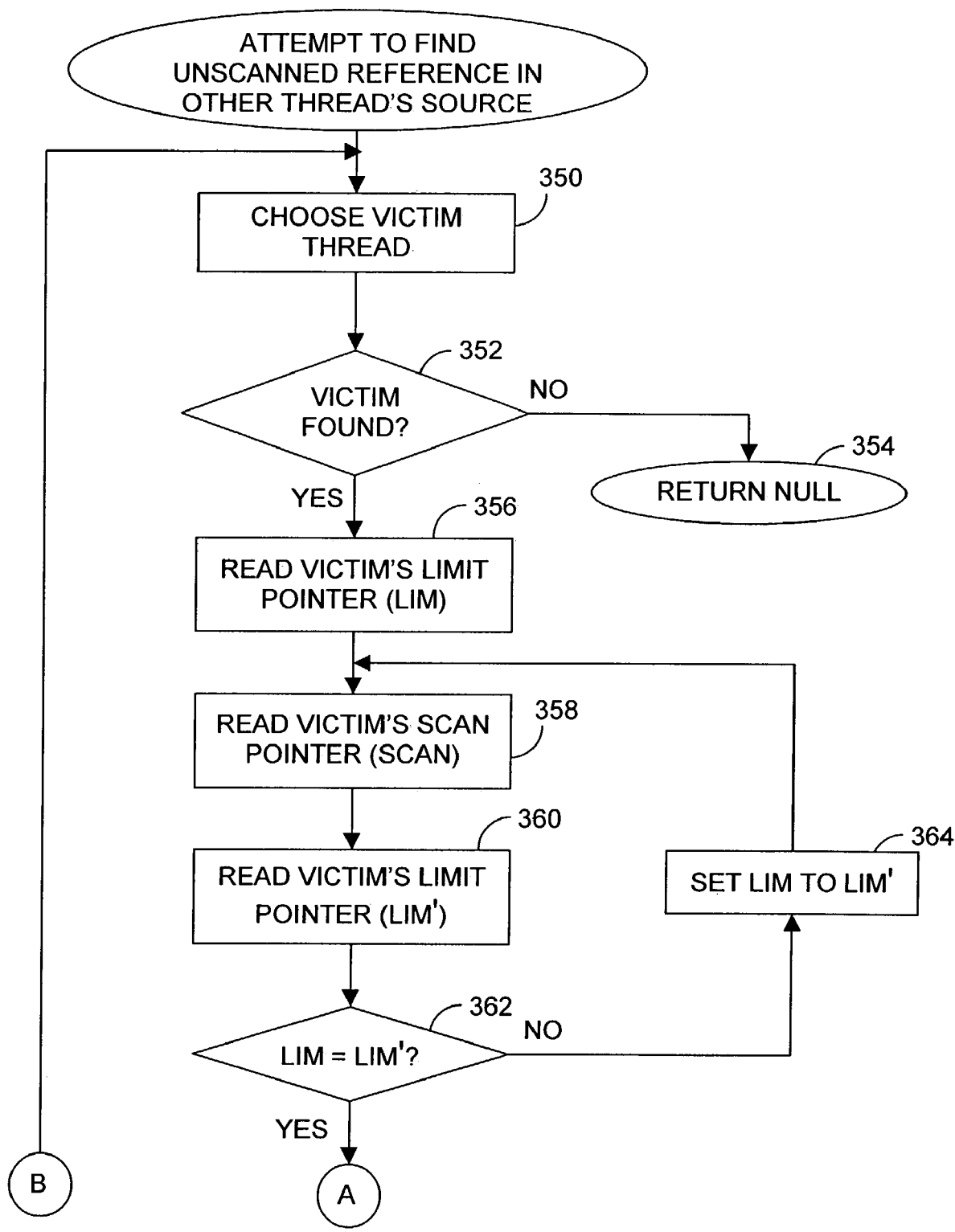
FIGS. 24A and 24B together constitute a flow chart of a routine that is similar to the routine of FIGS. 23A and 23B but that omits the latter routine's atomic operation.
Figure 24B:
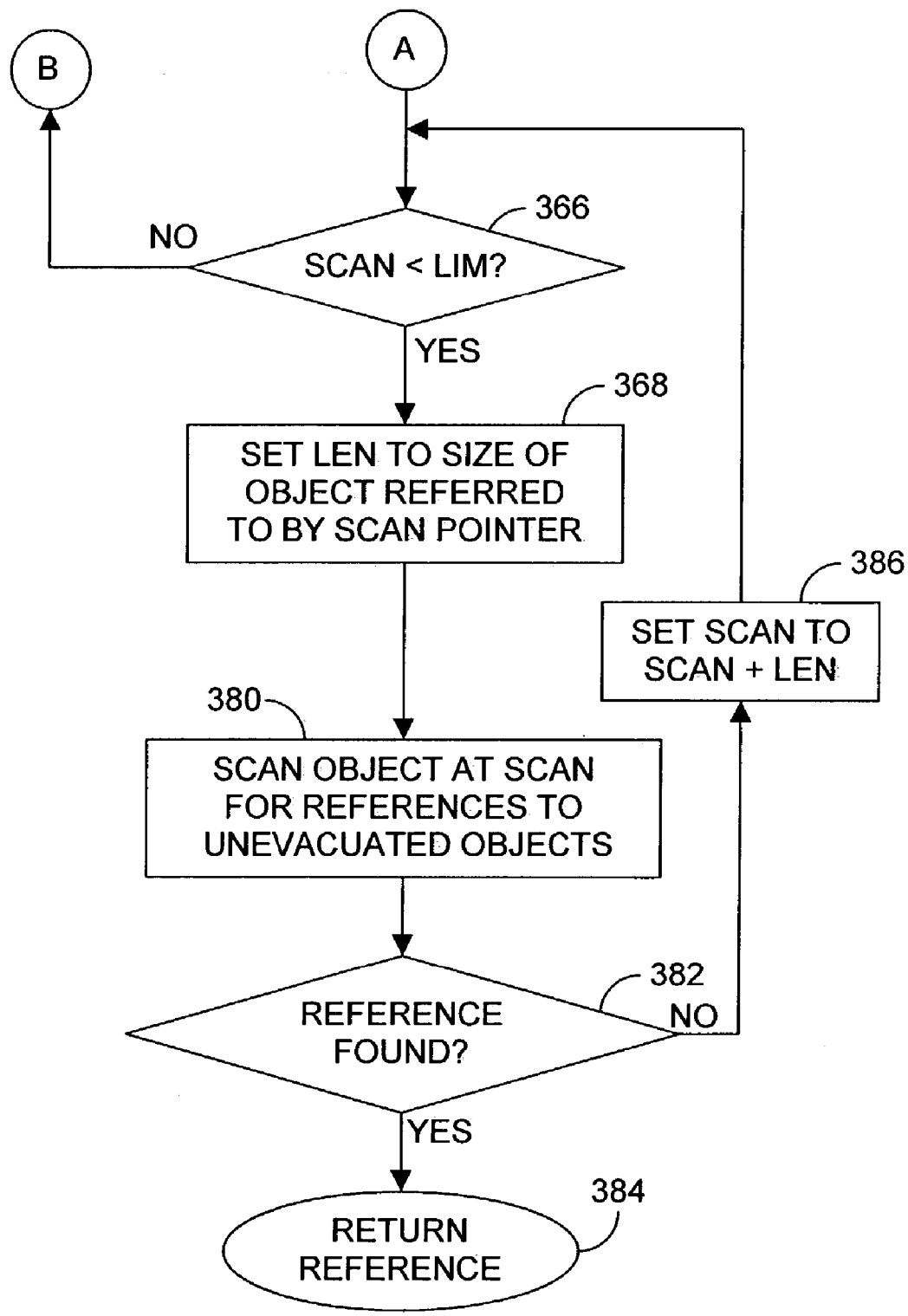

Now, although the FIG. 23 approach to obtaining work from a victim thread's LAB requires the stealer thread to employ an atomic operation, tasks can be obtained from a victim thread's LAB without resorting to that expense. FIGS. 24A and 24B (together, "FIG. 24") depict an approach that does not require atomic operations.

As that drawing shows, FIG. 24's blocks 350, 352, 354, 356, 358, 360, 362, 364, and 366 are identical to corresponding blocks in FIG. 23. Also, the operation represented by FIG. 24's block 368 is identical to the one that FIG. 23's block 336 represents, but its purpose is different, as will become apparent in due course. The FIG. 24 routine differs from the FIG. 23 routine in that the FIG. 24 routine does not claim an object in the victim's source LAB: it does not write into the victim thread's scan-pointer field. Instead, as FIG. 24's block 380 indicates, it simply scans the thereby-identified object for a reference to a collection-set object, without revising the scan pointer to let the victim thread know that the object has been scanned.

And, indeed, the scanned object may not thereby be scanned completely. Specifically, if the routine finds a reference to an unevacuated collection-set object, it returns that reference's value to the calling stealer routine, as blocks 382 and 384 indicate. The caller may, for instance, be a routine similar to the one that FIG. 22 depicts. But that routine's block 318 operation would be replaced with the FIG. 24 routine, the result of an operation performed in place of FIG. 22's block-325 test would be an indication of whether an unscanned reference had been found rather than whether an object had been stolen, and, since no object is stolen, the block-348 operation of adopting the stolen object as the source would be omitted. That is, the source would remain the destination LAB. So, if the stealer evacuates a reference-containing object to that destination LAB, it will not necessarily scan any further references in the object that it found in victim's source LAB.

Even if it does end up scanning all of that object's references (and, say, evacuating an object referred to by the last one), the stealer thread will not explicitly notify the victim of the fact that an object in its LAB has already been scanned. So the victim thread will scan the object again. When it encounters a reference to a collection-set object evacuated by the stealer thread, though, it will find that object already evacuated, and it will move on to the next reference in its source LAB.

Now, if the determination represented by FIG. 24's block 382 yields a negative result—i.e., if the object identified by the victim's scan pointer contains no reference to an unevacuated collection-set object—then the stealer proceeds to the next object in the victim thread's source LAB. As block 386 indicates, that is, it computes the address where the object ends that the scan-pointer value identified, and it returns to the block-366 operation of determining whether any evacuated object occupies that location. This continues until the routine either finds a reference to an unevacuated collection-set object or runs out of objects in the victim's LAB, in which case, as the drawing indicates, the routine again attempts to find a victim.

The present invention has breadth-first characteristics: an object's evacuation is not necessarily followed immediately by its descendants'. It nevertheless affords much of the collocation advantages of a depth-first search, because the breadth-first search is interrupted for descendant evacuation when the LAB's fill threshold is reached. Moreover, although the technique limits the descendants' evacuations, too, in accordance with the LABs' fill levels, the illustrated embodiment's use of a last-in, first-out stack as the mechanism for returning to unscanned LABs reduces the adverse effect on collocation that thus interrupting descendant evacuation causes. And use of LAB stacks facilitates the use of stealing for load balancing. The present invention thus constitutes a significant advance in the art.

What is claimed is:

1. For operating a computer system that includes a memory as a garbage collector that reclaims space in the memory occupied by unreachable objects, method comprising:
   A) dividing a to space of the memory into local allocation buffers (LABs) with which respective fill thresholds are associated, the fill thresholds of at least some LABs being less than those LABs' capacities and greater than empty;
   B) adopting one said LAB at a time as a destination LAB and one said LAB at a time as a source LAB;
   C) performing an evacuation operation that includes repeatedly evacuating into the destination lab objects in a from space of the memory referred to by references in the source lab while:
      i) if the destination LAB becomes full, replacing that LAB with a new LAB as the destination LAB;
      ii) monitoring the level to which the destination LAB has been filled to determine when it reaches the destination LAB's fill threshold and, if the destination LAB is not already the source LAB when the level reaches the destination LAB's fill threshold:
         a) placing the source LAB on a LAB stack if the source LAB contains references to from-space objects that have not yet been evacuated; and
         b) adopting the destination LAB as the source LAB; and iii) if the source LAB is the destination LAB, no reference in the source LAB refers to an object in the from space that has not yet been evacuated, and at least one LAB remains on the LAB stack, adopting as the source LAB the last LAB added to the LAB stack; and D) reclaiming the from space.

2. A method as defined in claim 1 that further comprises dynamically varying the fill thresholds.

3. A method as defined in claim 1 wherein not all the fill thresholds are same.

4. A method as defined in claim 1 wherein the garbage collector operates in accordance with the train algorithm to reclaim memory in increments of car sections.

5. A method as defined in claim 4 wherein at least one of the car sections consists of a plurality of LABs.

6. For operating a computer system that includes a memory as a garbage collector that executes in a plurality of threads to reclaim space in the memory occupied by unreachable objects, method comprising:
  A) dividing a to space of the memory into local allocation buffers (LABs) with which respective fill thresholds are associated;
  B) employing each thread to:
    i) adopt one said LAB at a time as that thread's destination LAB and one said LAB at a time as that thread's source LAB; and
    ii) perform an evacuation operation that includes repeatedly evacuating into the destination LAB objects in a from space of the memory referred to by references in the source LAB while:
      a) if that thread's destination LAB becomes full, replacing that LAB with a new LAB as that thread's destination LAB;
      b) monitoring the level to which the destination LAB has been filled to determine when it reaches the destination LAB's fill threshold and, if the destination LAB is not already the source LAB when the level reaches the destination LAB's fill threshold:
        (1) placing the source LAB on a LAB stack if the source LAB contains references to from-space objects that have not yet been evacuated; and
        (2) adopting the destination LAB as the source LAB; and
      c) if that thread's source LAB is its destination LAB and no reference in its source LAB refers to an object in the from space that has not yet been evacuated:
        (1) if at least one LAB remains on its LAB stack, adopting as the source LAB a LAB on its LAB stack; and
        (2) if no LAB remains on its LAB stack and a LAB is available on the LAB stack of another said thread, adopting as that thread's source LAB a LAB on that other thread's LAB stack; and
  C) reclaiming the from space.

7. A method as defined in claim 6 that further comprises dynamically varying the fill thresholds.

8. A method as defined in claim 6 wherein not all the fill thresholds are same.

9. A method as defined in claim 6 wherein the garbage collector operates in accordance with the train algorithm to reclaim memory in increments of car sections.

10. A method as defined in claim 9 wherein at least one of the car sections consists of a plurality of LABs.

11. A method as defined in claim 6 wherein the LAB on its LAB stack that a thread adopts as its source LAB is the last one that it placed on its LAB stack.

12. A method as defined in claim 11 wherein the LAB on another thread's LAB stack that a thread adopts as its source LAB is the last one placed by that other thread on that other thread's LAB stack.

13. A method as defined in claim 6 wherein the LAB on another thread's LAB stack that a thread adopts as its source LAB is the last one placed by that other thread on that other thread's LAB stack.

14. A computer system comprising:
  A) processor circuitry operable to execute processor instructions; and
  B) memory circuitry, to which the processor circuitry is responsive, that contains processor instructions readable by the processor circuitry to configure the computer system as a garbage collector that reclaims space in the memory occupied by unreachable objects by:
    i) dividing a to space of the memory into local allocation buffers (LABs) with which respective fill thresholds are associated, the fill thresholds of at least some LABs being less than those LABs' capacities and greater than empty;
    ii) adopting one said LAB at a time as a destination LAB and one said LAB at a time as a source LAB;
    iii) performing an evacuation operation that includes repeatedly evacuating into the destination LAB objects in a from space of the memory referred to by references in the source LAB while:
      a) if the destination LAB becomes full, replacing that LAB with a new LAB as the destination LAB;
      b) monitoring the level to which the destination LAB has been filled to determine when it reaches the destination LAB's fill threshold and, if the destination LAB is not already the source LAB when the level reaches the destination LAB's fill threshold:
        (1) placing the source LAB on a LAB stack if the source LAB contains references to from-space objects that have not yet been evacuated; and
        (2) adopting the destination LAB as the source LAB; and
      c) if the source LAB is the destination LAB, no reference in the source LAB refers to an object in the from space that has not yet been evacuated, and at least one LAB remains on the LAB stack, adopting as the source LAB the last LAB added to the LAB stack; and iv) reclaiming the from space.

15. A computer system as defined in claim 14 wherein the garbage collector dynamically varies the fill thresholds.

16. A computer system as defined in claim 14 wherein not all the fill thresholds are same.

17. A computer system as defined in claim 14 wherein the garbage collector operates in accordance with the train algorithm to reclaim memory in increments of car sections.

18. A computer system as defined in claim 17 wherein at least one of the car sections consists of a plurality of LABs.

19. A computer system comprising:
  A) processor circuitry operable to execute processor instructions; and
  B) memory circuitry, to which the processor circuitry is responsive, that contains processor instructions readable by the processor circuitry to configure the computer system as a garbage collector that executes in a plurality of threads to reclaim space in the memory occupied by unreachable objects by:

i) dividing a to space of the memory into local allocation buffers (LABs) with which respective fill thresholds are associated;
ii) employing each thread to:
   a) adopt one said LAB at a time as that thread's destination LAB and one said LAB at a time as that thread's source LAB; and
   b) perform an evacuation operation that includes repeatedly evacuating into the destination LAB objects in a from space of the memory referred to by references in the source LAB while:
      (1) if that thread's destination LAB becomes full, replacing that LAB with a new LAB as that thread's destination LAB;
      (2) monitoring the level to which the destination LAB has been filled to determine when it reaches the destination LAB's fill threshold and, if the destination LAB is not already the source LAB when the level reaches the destination LAB's fill threshold:
         (a) placing the source LAB on a LAB stack if the source LAB contains references to from-space objects that have not yet been evacuated; and
         (b) adopting the destination LAB as the source LAB; and
      (3) if that thread's source LAB is its destination LAB and no reference in its source LAB refers to an object in the from space that has not yet been evacuated:
         (a) if at least one LAB remains on its LAB stack, adopting as the source LAB a LAB on its LAB stack; and
         (b) if no LAB remains on its LAB stack and a LAB is available on the LAB stack of another said thread, adopting as that thread's source LAB a LAB on that other thread's LAB stack; and
   iii) reclaiming the from space.

20. A computer system as defined in claim 19 wherein the garbage collector dynamically varies the fill thresholds.

21. A computer system as defined in claim 19 wherein not all the fill thresholds are same.

22. A computer system as defined in claim 19 wherein the garbage collector operates in accordance with the train algorithm to reclaim memory in increments of car sections.

23. A computer system as defined in claim 22 wherein at least one of the car sections consists of a plurality of LABs.

24. A computer system as defined in claim 19 wherein the LAB on its LAB stack that a thread adopts as its source LAB is the last one that it placed on its LAB stack.

25. A computer system as defined in claim 24 wherein the LAB on another thread's LAB stack that a thread adopts as its source LAB is the last one placed by that other thread on that other thread's LAB stack.

26. A computer system as defined in claim 19 wherein the LAB on another thread's LAB stack that a thread adopts as its source LAB is the last one placed by that other thread on that other thread's LAB stack.

27. A storage medium containing instructions readable by a computer system that includes memory to configure the computer system to operate as a garbage collector that reclaims space in the memory occupied by unreachable objects by:
   A) dividing a to space of the memory into local allocation buffers (LABs) with which respective fill thresholds are associated, the fill thresholds of at least some LABs being less than those LABs' capacities and greater than empty;
   B) adopting one said LAB at a time as a destination LAB and one said LAB at a time as a source LAB;
   C) performing an evacuation operation that includes repeatedly evacuating into the destination LAB objects in a from space of the memory referred to by references in the source LAB while:
      i) if the destination LAB becomes full, replacing that LAB with a new LAB as the destination LAB;
      ii) monitoring the level to which the destination LAB has been filled to determine when it reaches the destination LAB's fill threshold and, if the destination LAB is not already the source LAB when the level reaches the destination LAB's fill threshold:
         a) placing the source LAB on a LAB stack if the source LAB contains references to from-space objects that have not yet been evacuated; and
         b) adopting the destination LAB as the source LAB; and
      iii) if the source LAB is the destination LAB, no reference in the source LAB refers to an object in the from space that has not yet been evacuated, and at least one LAB remains on the LAB stack, adopting as the source LAB the last LAB added to the LAB stack; and
   D) reclaiming the from space.

28. A storage medium as defined in claim 27 wherein the garbage collector dynamically varies the fill thresholds.

29. A storage medium as defined in claim 27 wherein not all the fill thresholds are same.

30. A storage medium as defined in claim 27 wherein the garbage collector operates in accordance with the train algorithm to reclaim memory in increments of car sections.

31. A storage medium as defined in claim 30 wherein at least one of the car sections consists of a plurality of LABs.

32. A storage medium containing instructions readable by a computer system that includes memory to configure the computer system to operate as a garbage collector that executes in a plurality of threads to reclaim space in the memory occupied by unreachable objects by:
   A) dividing a to space of the memory into local allocation buffers (LABs) with which respective fill thresholds are associated;
   B) employing each thread to:
      i) adopt one said LAB at a time as that thread's destination LAB and one said LAB at a time as that thread's source LAB; and
      ii) perform an evacuation operation that includes repeatedly evacuating into the destination LAB objects in a from space of the memory referred to by references in the source LAB while:
         a) if that thread's destination LAB becomes full, replacing that LAB with a new LAB as that thread's destination LAB;
         b) monitoring the level to which the destination LAB has been filled to determine when it reaches the destination LAB's fill threshold and, if the destination LAB is not already the source LAB when the level reaches the destination LAB's fill threshold:
            (1) placing the source LAB on a LAB stack if the source LAB contains references to from-space objects that have not yet been evacuated; and
            (2) adopting the destination LAB as the source LAB; and c) if that thread's source LAB is its destination LAB and no reference in its source LAB refers to an object in the from space that has not yet been evacuated:
(1) if at least one LAB remains on its LAB stack, adopting as the source LAB a LAB on its LAB stack; and
(2) if no LAB remains on its LAB stack and a LAB is available on the LAB stack of another said thread, adopting as that thread's source LAB a LAB on that other thread's LAB stack; and
C) reclaiming the from space.

33. A storage medium as defined in claim 32 wherein the garbage collector dynamically varies the fill thresholds.

34. A storage medium as defined in claim 33 wherein not all the fill thresholds are same.

35. A storage medium as defined in claim 32 wherein the garbage collector operates in accordance with the train algorithm to reclaim memory in increments of car sections.

36. A storage medium as defined in claim 35 wherein at least one of the car sections consists of a plurality of LABs.

37. A storage medium as defined in claim 32 wherein the LAB on its LAB stack that a thread adopts as its source LAB is the last one that it placed on its LAB stack.

38. A storage medium as defined in claim 37 wherein the LAB on another thread's LAB stack that a thread adopts as its source LAB is the last one placed by that other thread on that other thread's LAB stack.

39. A storage medium as defined in claim 32 wherein the LAB on another thread's LAB stack that a thread adopts as its source LAB is the last one placed by that other thread on that other thread's LAB stack.

40. An apparatus for reclaiming space in a computer system's memory occupied by unreachable objects comprising:
A) means for dividing a to space of the memory into local allocation buffers (LABs) with which respective fill thresholds are associated, the fill thresholds of at least some LABs being less than those LABs' capacities and greater than empty;
B) means for adopting one said LAB at a time as a destination LAB and one said LAB at a time as a source LAB;
C) means for performing an evacuation operation that includes repeatedly evacuating into the destination LAB objects in a from space of the memory referred to by references in the source LAB while:
i) if the destination LAB becomes full, replacing that LAB with a new LAB as the destination LAB;
ii) monitoring the level to which the destination LAB has been filled to determine when it reaches the destination LAB's fill threshold and, if the destination LAB is not already the source LAB when the level reaches the destination LAB's fill threshold: a) placing the source LAB on a LAB stack if the source LAB contains references to from-space objects that have not yet been evacuated; and b) adopting the destination LAB as the source LAB; and
iii) if the source LAB is the destination LAB, no reference in the source LAB refers to an object in the from space that has not yet been evacuated, and at least one LAB remains on the LAB stack, adopting as the source LAB the last LAB added to the LAB stack; and
D) means for reclaiming the from space.

41. For employing a plurality of execution threads to reclaim space in a computer system's memory occupied by unreachable objects, an apparatus comprising:
A) means for dividing a to space of the memory into local allocation buffers (LABs) with which respective fill thresholds are associated;
B) means for employing each thread to:
i) adopt one said LAB at a time as that thread's destination LAB and one said LAB at a time as that thread's source LAB; and
ii) perform an evacuation operation that includes repeatedly evacuating into the destination LAB objects in a from space of the memory referred to by references in the source LAB while:
a) if that thread's destination LAB becomes full, replacing that LAB with a new LAB as that thread's destination LAB;
b) monitoring the level to which the destination LAB has been filled to determine when it reaches the destination LAB's fill threshold and, if the destination LAB is not already the source LAB when the level reaches the destination LAB's fill threshold:
(1) placing the source LAB on a LAB stack if the source LAB contains references to from-space objects that have not yet been evacuated; and
(2) adopting the destination LAB as the source LAB; and
c) if that thread's source LAB is its destination LAB and no reference in its source LAB refers to an object in the from space that has not yet been evacuated:
(1) if at least one LAB remains on its LAB stack, adopting as the source LAB a LAB on its LAB stack; and
(2) if no LAB remains on its LAB stack and a LAB is available on the LAB stack of another said thread, adopting as that thread's source LAB a LAB on that other thread's LAB stack; and
C) means for reclaiming the from space.

42. For operating a computer system that includes a memory as a garbage collector that executes in a plurality of threads to reclaim space in the memory occupied by unreachable objects, method comprising:
A) dividing a to space of the memory into local allocation buffers (LABs) with which respective fill thresholds are associated;
B) employing each thread to:
i) adopt one said LAB at a time as that thread's destination LAB and one said LAB at a time as that thread's source LAB; and
ii) perform an evacuation operation that includes repeatedly evacuating into the destination LAB objects in a from space of the memory referred to by references in the source LAB while:
a) if that thread's destination LAB becomes full, replacing that LAB with a new LAB as that thread's destination LAB;
b) monitoring the level to which the destination LAB has been filled to determine when it reaches the destination LAB's fill threshold and, if the destination LAB is not already the source LAB when the level reaches the destination LAB's fill threshold:
  (1) placing the source LAB on a LAB stack if the source LAB contains references to from-space objects that have not yet been evacuated; and
  (2) adopting the destination LAB as the source LAB; and
c) if that thread's source LAB is its destination LAB and no reference in its source LAB refers to an object in the from space that has not yet been evacuated:
  (1) if at least one LAB remains on its LAB stack, adopting as the source LAB a LAB on its LAB stack; and
  (2) at least in some situations in which no LAB remains on its LAB stack, evacuating into the destination LAB objects in the from space referred to by references in the another thread's source LAB; and
C) reclaiming the from space.

* * * * *